(12) United States Patent
Sato et al.

(10) Patent No.: US 7,016,132 B2
(45) Date of Patent: Mar. 21, 2006

(54) MAGNETIC DATA EMBEDDING SYSTEM

(75) Inventors: Kiminori Sato, Tokyo (JP); Akira Saito, Tokyo (JP); Hiroyuki Yoshimura, Tokyo (JP); Takuya Ono, Tokyo (JP); Tsuyoshi Yoshizawa, Tokyo (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 206 days.

(21) Appl. No.: 10/764,598

(22) Filed: Jan. 27, 2004

(65) Prior Publication Data
US 2005/0073762 A1 Apr. 7, 2005

(30) Foreign Application Priority Data
Jan. 27, 2003 (JP) ............................. 2003-016897
Mar. 3, 2003 (JP) ............................. 2003-055264

(51) Int. Cl.
G11B 5/02 (2006.01)
G11B 27/36 (2006.01)

(52) U.S. Cl. ..................... 360/31; 360/69; 360/77.02; 360/77.05; 360/77.08; 360/78.14; 360/75; 360/15

(58) Field of Classification Search ................. 360/31, 360/15
See application file for complete search history.

(56) References Cited

U.S. PATENT DOCUMENTS

| 6,704,156 B1 * | 3/2004 | Baker et al. .................. 360/75 |
| 2003/0137765 A1 * | 7/2003 | Yamazaki et al. ............ 360/39 |
| 2004/0218299 A1 * | 11/2004 | Sato et al. .................... 360/31 |

FOREIGN PATENT DOCUMENTS

| JP | 03-214474 | 9/1991 |
| JP | 06-028793 | 2/1994 |
| JP | 06-044711 | 2/1994 |
| JP | 06-060545 | 3/1994 |
| JP | 10-172254 | 6/1998 |
| JP | 11-260008 | 9/1999 |
| JP | 2001-216750 | 8/2001 |

* cited by examiner

Primary Examiner—David Hudspeth
Assistant Examiner—Natalia Figueroa
(74) Attorney, Agent, or Firm—Rabin & Berdo, PC

(57) ABSTRACT

A magnetic data embedding system (or disk servo writer) includes a stack with a master disk (3) and a plurality of magnetic disks (4) mounted on a shaft of a spindle motor (6), and a rotary positioner (11) which integrally holds one or more read-only heads ($7_1$ to $7_4$) for reading the master disk and a plurality of groups of servo heads ($10_1$ to $10_4$) and which simultaneously turns both of the kinds of heads. The groups of servo heads have access to the top and bottom sides of the magnetic disks. The servo heads are made carry out writing to the same (top or bottom) side of each of the disks in parallel, within assigned track ranges for the respective servo heads. In order to make the servo heads on the same side of the disks carry out writing correctly in their assigned track ranges in several of the disclosed embodiments, an address correction data memory (23) supplies information about track position errors between the read-only heads and their associated servo heads to a servo head address deriving unit (24), which corrects track addresses of items of servo information read by the read-only heads and transmits the corrected track addresses to a servo pattern generator (9) to make the servo heads write the corrected address. This shortens the time needed for writing servo patterns to magnet disks with high density and high accuracy.

28 Claims, 19 Drawing Sheets

MAGNETIC DATA EMBEDDING SYSTEM

BACKGROUND OF THE INVENTION

1. Field of the Invention

The present invention relates to a magnetic data embedding system, also known as a disk servo writer, for writing magnetic data into a raw magnetic disk (in which nothing is written beforehand) when magnetic disks are being manufactured. The magnetic data that needs to be written includes servo patterns used for detecting the position of a magnetic head, ID patterns for identifying the magnetic disk, and programs written in compliance with the requirements of clients (hereinafter such magnetic data will be collectively referred to as "embedded data").

In the following explanations, the same reference numerals and signs in the drawings will denote the same or equivalent parts.

2. Description of the Related Art

FIG. 21 is a conceptual illustration showing an arrangement of regions of embedded data that are embedded (written) in a raw magnetic disk 4. The reference character PS2 in the figure denotes one of the servo patterns written in regions radially provided at equal intervals (that is, at sector intervals) on each side of the magnetic disk 4. The reference character DTA denotes one of the data regions. Disk identifying ID patterns and programs are written in the data regions DTA in compliance with requirements of clients when the magnetic disk 4 is manufactured, and data are written in the data regions DTA by a user after the magnetic disk 4 is provided in a product.

The servo patterns PS2 include items of information for determining the actual position of a magnetic head on the magnetic disk 4 when the magnetic disk is in service. The items of information include further items of information for indicating synchronization points and items of coordinate information (such as track addresses and sector addresses).

FIGS. 19A and 19B show an example of an arrangement of a related magnetic data embedding system used for writing the servo patterns PS2 in the magnetic disk 4. A similar system is disclosed in JP-A-2001-216750. In the magnetic data embedding system 101, disk stack unit 5 is integrally assembled onto a shaft of a spindle motor 6 so as to be rotated at a high speed. In the disk stack unit 5, a plurality of M (nine in the figure) magnetic disks 4 and a clock pattern disk 3C provided thereunder are coaxially stacked (piled).

Here, the clock pattern disk 3C has an outermost peripheral section where a clock pattern PC0, for example, is written as shown in FIG. 20 by the system 101 before the servo patterns PS2 are written into the magnetic disks 4. The clock pattern disk 3C is made of the same type of raw disk as the magnetic disks 4. The servo patterns PS2 are written into the magnetic disks 4 in synchronism with a clock signal (usually simply called a "clock" hereafter) obtained by reading out the clock patterns PC0.

Reference numeral 10C in FIGS. 9A and 9B denotes a clock head that directly carries out reading and writing of the clock pattern that PC0 from and to the clock pattern disk 3C. Reference numeral 11C denotes a clock head positioner that supports the clock head 10C to fix and position the head 10C at the outermost peripheral section of the clock pattern disk 3C, in this example. Reference numeral 9C denotes a clock pattern generator that produces a signal of for writing the clock patterns PC0 into the clock pattern disk 3C.

Reference numeral 10 denotes one of a plurality of servo heads, which are provided on both sides of each of the M magnetic disks 4 in a one to one correspondence for writing the servo patterns PS2 directly onto the disks 4. Reference numeral 11 denotes a rotary positioner that supports the servo heads 10 in a stacked state and rotates with a shaft 11a for shifting the servo heads 10 to a desired radial position.

Reference numeral 18 denotes an encoder provided that is coaxially integrated with the rotary positioner 11 for detecting the position of rotation of the rotary positioner 11. Reference numeral 19 denotes a position-detecting unit for obtaining a an analog value for the position of the servo head 10 in the radial direction of the magnetic disks 4 from the position detected by the encoder 18.

A servo compensator 12 and a power amplifier 13 form a feed back loop together with the encoder 18 and the position-detecting unit 19 for the rotary positioner 11. The feed back loop controls the positioning of the servo heads 10 in the radial direction of the magnetic disks 4. That is, it controls the positioning of the servo heads 10 onto the center of a desired track.

An error signal, representing the difference between a target head position signal $\rho s$ for the servo heads 10 and a signal from the position-detecting unit 19 (representing the detected head position $\rho$, or the actual radial position of the servo heads 10), is supplied to 5 the servo compensator 12. The signal $\rho s$ has an analog value corresponding to the radius of the center of a target track. The error signal inputted to the servo compensator 12 is then amplified for obtaining a servo compensating value so as to minimize the error. The power amplifier 13, on the basis of the servo compensating value, outputs a current for driving the rotary positioner 11 to move the servo head 10.

Reference numeral 9 denotes a servo pattern generator that receives the clock from the clock head 10C and supplies the generated servo patterns PS2 to each of the servo heads 10 stacked on the rotary positioner 11 in order to generate the servo patterns PS2.

The operation of the whole system shown in FIG. 19 will now be explained. First, the clock head 10C records the clock patterns PC0, generated by the clock pattern generator 9C, at an arbitrary radial position (at the outermost periphery in FIG. 20) on the clock pattern disk 3C.

Next, the actual radial head position $\rho$ of the servo head 10 is detected by the encoder 18. A signal representing the error between the detected head position $\rho$ and a target head position $\rho s$ is fed back through the servo compensator 12 and the power amplifier 13 to make each servo head 10 follow up the target head position $\rho s$ using the rotary positioner 11.

When the servo heads 10 are located at the target position, and in synchronism with the clock read out from the clock pattern disk 3C through the clock head 10C, the servo heads 10 simultaneously carry out writing of the servo patterns PS2 generated by the servo pattern generator 9 on the respective sides of the magnetic disks 4.

In addition too the servo patterns PS2, the servo pattern generator 9 also carries out the writing of such data as ID data and programs into the data regions DTA of the magnetic disk 4 through the servo heads 10 in synchronism with the clock read out from the clock disk 3C.

Related procedures for writing (embedding) data into magnetic disks will be discussed below. One is a procedure in which, in a magnetic disk system, one of magnetic disks is taken as a master side, master servo patterns are written in the master side, and servo patterns are written into the other sides while carrying out positioning on the basis of the master servo patterns (see JP-A-10-172254 and JP-A-3-214474). Moreover, there is a procedure in which, in a magnetic data embedding system, servo patterns are simultaneously written on the same side of a magnetic disk by a plurality of magnetic heads (see JP-A-6-44711).

Furthermore, JP-A-6-60545 discloses a procedure in which, in a magnetic disk system, items of servo information are simultaneously written into a plurality of magnetic disks by signals from an external servo writer. Besides, JP-A-6-28793 discloses a procedure for carrying out off-track compensation in a magnetic disk system.

In addition to this, a servo-writing method and a servo writer are disclosed in JP-A-11-260008. A plurality of magnetic heads are used for writing servo signals on the same side of a flexible magnetic disk. A signal indicating a reference position written to the disc medium by one magnetic head is read out by another magnetic head to carry out compensation control of a writing position of a servo signal. This prevents deviations of the position of the servo signal throughout the disk media.

A related magnetic data embedding system (disk servo writer) is a system in which servo patterns, generated by a servo pattern generator in synchronism with a clock pattern stored in a clock pattern disk beforehand, are written simultaneously into stacked disks. Thus, the time required for writing the servo patterns onto all sides of the disks becomes equal to (time for one revolution of the disk)×(the number of writing tracks).

As the track density of a magnetic disk increases, the writing time becomes progressively longer. The time can be reduced by increasing the revolution speed of the disk. This, however, causes increased mechanical vibration as a trade-off and makes it difficult to write high-accuracy servo patterns.

The rate at which magnetic disks are processed can be improved by increasing the number of stacked magnetic disks. This, however, increases the load on the spindle motor and reduces the accuracy of revolution. Moreover, the increased number of magnetic heads to be stacked makes it difficult to keep the mounting accuracy of the magnetic heads within a desired range.

Moreover, in a related magnetic data embedding system, a rotary encoder is used for detecting the position of a magnetic head. In such a system, however, as the recording density is increased, the necessary magnetic head position detection accuracy may exceed the accuracy of the rotary encoder. This requires a position detection unit with higher accuracy.

SUMMARY OF THE INVENTION

It is an object of the present invention to provide a magnetic data embedding system that can shorten the writing time for embedded data and, at the same time, provide position detection with an accuracy higher than that of a rotary encoder, without changing the revolution speed of magnetic disks and without increasing the number of stacked magnetic disks.

In order to achieve the above object, a magnetic data embedding system according to a first aspect of the invention includes:

a spindle motor (6);

a master disk (3) as a magnetic disk integrally mounted on a shaft of the spindle motor, the master disk being written with magnetic data (clock patterns PC1, servo patterns PS1, etc.) on at least one side thereof;

a plurality of magnetic disks served for writing (4) as magnetic disks being objects for writing, the magnetic disks being integrally mounted in a stack on the shaft of the spindle motor;

at least one reading side head (read only heads 7, 7A, 7B, $7_1$ to $7_4$, etc.) each being provided as a magnetic head for reading the magnetic data on the master disk;

a plurality of writing side heads (servo heads 10A, 10B, $10_1$ to $10_4$, etc.) as magnetic heads provided in groups, each group including one of single head and a plurality of heads with the specified number, and being provided on each side of each of the magnetic disks served for writing so that each head gains access thereto; and at least one rotary positioner (11, 11A, 11B, etc.) each integrally holding at least one reading side head and the groups of the writing side heads in a stack in being turnable, and being disposed on the periphery of the stacked magnetic disks so that at least a plurality of the writing side heads are presented to gain access to the same side of each of the magnetic disks served for writing, each of the writing side heads, each corresponding to each of the reading side head, being so provided as to carry out writing onto the side of the magnetic disk served for writing, corresponding to the writing side head, in parallel with other writing side heads on the same side of the magnetic disk served for writing corresponding thereto with a track range for writing being assigned to each of the writing heads, the writing being carried out with one of the magnetic data read out by each of the reading side heads and finally written magnetic data presented as modified magnetic data prepared on the basis of the magnetic data.

A magnetic data embedding system according to the second aspect of the invention includes:

a spindle motor (6);

a master disk (3) as a magnetic disk integrally mounted on a shaft of the spindle motor, the master disk being written with magnetic data including servo information (clock patterns PC1, servo patterns PS1, etc.) on at least one side thereof;

a plurality of magnetic disks served for writing (4) as magnetic disks being objects for writing, the magnetic disks being integrally mounted in a stack on the shaft of the spindle motor;

at least one reading side head (read only heads 7, 7A, 7B, $7_1$ to $7_4$, etc.) each being provided as a magnetic head for reading the magnetic data on the master disk;

a plurality of writing side heads (servo heads 10A, 10B, $10_1$ to $10_4$, etc.) as magnetic heads provided in groups, each group including one of single head and a plurality of heads with the specified number, and being provided on each side of each of the magnetic disks served for writing so that each head gains access thereto; and at least one rotary positioner (11, 11A, 11B, etc.) each integrally holding the at least one reading side head and the groups of the writing side heads in a stack in being turnable so that each of the reading side heads and each of the writing side heads are positioned on a common plane including the axis of the shaft of the spindle motor, and being disposed on the periphery of the stacked magnetic disks so that at least a plurality of the writing side heads are presented to gain access to the same side of each of the magnetic disks served for writing;

a head position control unit (a head position and clock detecting unit 8, 8A, 8B, a servo compensator 12, a power amplifier 13, etc.) provided for each of the rotary positioners, the unit carrying out comparison of a target head position (Rs) and a detected head position (R) to turn the rotary positioner so that the difference between the target head position and the detected head position becomes minimum and bringing the detected head position to be stably settled at the target head position, the target head position being externally given as a radial position on the master disk to be followed up by a specified reading side head of the reading side heads on the rotary positioner, and the detected head position being taken as a radial position of the reading side head on the master disk, the radial position being obtained from the magnetic data read out by the reading side head as an object to be followed up; and an address correcting unit (a track position correcting unit 22 with additional partial function of a servo pattern generator 9A, a servo head address deriving unit 24, etc.) carrying out correction of at least a track address (Trk) of items of address information in one of the magnetic data read out (through the head position and clock detecting unit 8, 8A, 8B, etc.) by each of the reading side heads on the master disk, which heads are provided on each of the rotary positioners, and modified magnetic data prepared on the basis of the magnetic data, and producing one of corrected magnetic data and corrected modified magnetic data (hereinafter referred to as "finally written magnetic data") for the writing side head corresponding to the reading head, the finally written magnetic data including the at least track address of the items of the address information corrected by a specified amount as necessary with reference to address correction data (data stored in stably settled value memories 21X, 21Y, an address correction data memory 23, etc.) measured beforehand, each of the writing side heads being so provided as to carry out writing of the finally written magnetic data, each being produced for the writing side head itself (being thereafter converted into writing patterns by the servo pattern generator 9, 9A, 9B, etc.), onto the side of the magnetic disk served for writing, corresponding to the writing side head, in parallel with other writing side heads on the same side of the magnetic disk served for writing corresponding thereto, with its own track range for writing being assigned.

A magnetic data embedding system according to the third aspect of the invention is, in the magnetic data embedding system according to the first or the second aspect, made to further include a unit (a servo head address deriving unit 24, etc.) which monitors the track addresses of the finally written magnetic data of which each of the writing side heads carries out writing to its own corresponding magnetic disk served for writing, and inhibits writing of the finally written magnetic data when the monitored track address is found to be out of a track range assigned to the writing side head beforehand.

A magnetic data embedding system according to the fourth aspect of the invention is, in the magnetic data embedding system according to any one of the first to the third aspects, made to further include a unit (a write data memory 16) which is provided for each of the rotary positioners for storing data to be written in a data region (DTA) of the magnetic disk served for writing, provides data (Data) to each of the writing side heads (through the servo pattern generator 9, 9A, 9B, etc.), the data (Data) being to be written to a data region (DTA) with an address of the finally written magnetic data written by the writing side head, and makes the writing side head carry out writing of the data to the data region with the address.

A magnetic data embedding system according to the fifth aspect of the invention is a system in which, in the magnetic data embedding system according to any one of the second to the fourth aspects, the address correcting unit includes:

a first track difference correcting unit (the track position correcting unit 22 with additional partial function of the servo pattern generator 9A, the servo head address deriving unit 24, etc.) carrying out correction of track differences presented between track positions of magnetic heads, separately provided on any two of a plurality of the rotary positioners, on at least one side of the two rotary positioners; and a second track difference correcting unit (the servo head address deriving unit 24, etc.) carrying out, on each of the rotary positioner sides, correction of track difference presented in each of the same rotary positioner between a track position of the at least one reading side head and each of track positions of a plurality of the writing side heads on each side of the magnetic disks served for writing, each of the writing side heads being in the above correspondence with each of the respective reading side heads.

A magnetic data embedding system according to the sixth aspect of the invention is a system in which, in the magnetic data embedding system according to the fifth aspect, the address correction data to which the first track difference correcting unit refers are data obtained by:

in each pair of the rotary positioners of a plurality of the rotary positioners and on each side of the magnetic disk served for writing, making a specified writing side head (10B, etc.), positioned on the side of the magnetic disk served for writing and provided on one side of a pair of the rotary positioners (hereinafter referred to as a "first rotary positioner"), write a specified line (σB, etc.), with the reading side head (7B, etc.) as the object to be followed up on the first rotary positioner being made to follow up a specified track (X, etc.);

then, while changing a track to be followed up by the reading side head (7A, etc.), as the object to be followed up, on the other one of the pair of the rotary positioners (hereinafter referred to as a "second rotary positioner"), making a specified writing side head (10A, etc.), provided on the second rotary positioner side and positioned on the magnetic disks served for writing, position at the specified line; and using at least a track difference ((X−Y), etc.) at this time between the track position of the specified one of the reading side head (7B, etc.) on the first rotary positioner side and the track position of the specified one of the reading side head (7A, etc.) on the second rotary positioner side.

A magnetic data embedding system according to the seventh aspect of the invention is a system in which, in the magnetic data embedding system according to the fifth or sixth aspect, the address correction data to which the second track difference correcting unit refers are data obtained by:

making one of a pair of the writing side heads (10₂, 10₃, 10₄, etc., hereinafter referred to as a "first writing side head") of a plurality of the writing side heads, selected at least an object of the measurement on the side of the magnetic disk served for writing, write a specified line (σ2, σ3, σ4, etc.) in each of the rotary positioners and on each side of the magnetic disk served for writing, with the reading side head (7, 7₂, etc.) as the object to be followed up being made to follow up a specified track (X, etc., hereinafter referred to as a "first track") on the same rotary positioner;

then, while changing a track to be followed up by the reading side head as the object to be followed up, making the other writing side head of the pair (10₁, 10₂, 10₃, etc., hereinafter referred to as a "second writing side head") position at the specified line;

making the reading side head as the object to be followed up read out a position of a track which the reading side head follows up (Y1, Y2, etc., hereinafter referred to as a "second track") at this time;

taking the track position difference between the positions of the first track and the second track as the track position difference ((Y1−X), (Y2−X), etc.) between the track of the first writing side head and the track of the second writing side head;

carrying out similar kinds of processing with pairs of writing side heads selected as objects of the measurement changed by turns to thereby obtain a track position difference between each of a plurality of the writing side heads (hereinafter referred to as a "first track position difference") on the side of the magnetic disk served for writing;

along with this, obtaining a track position difference between a plurality of the reading side heads corresponding to the first track position difference (hereinafter referred to as a "second track position difference"), when at least one reading side head presented on the master disk are provided as a plurality thereof;

using at least the first track position differences and the second track position differences when a plurality of the reading side heads are presented on the master disk on the rotary positioner; and using at least the first track position difference when one reading head is presented on the master disk on the rotary positioner.

A magnetic data embedding system according to the eighth aspect of the invention is a system in which, in the magnetic data embedding system according to any one of the first to the sixth aspects, on the master disk, one reading side head is provided for each of the rotary positioners, on each side of each of the magnetic disks served for writing, one writing side head is provided for each of the rotary positioners, the reading side head (7A, 7B) and each of the writing side heads (10A, 10B) (with subscripts A or B being identical with each other) in the same rotary positioner are in the above-described correspondence, and the reading side head and each of the writing side heads are so provided as to position on approximately the same radial positions of the master disk and each of the magnetic disks as being objects of the reading side head and each of the writing side heads gaining access thereto, respectively.

A magnetic data embedding system according to the ninth aspect of the invention is a system in which, in the magnetic data embedding system according to any one of the first to the seventh aspects, on the same rotary positioner, a plurality of the reading side heads are disposed at approximately equal intervals on the master disk in the radial direction thereof and a plurality of the writing side heads with the number thereof made equal to the reading side heads are disposed at approximately equal intervals on each side of each of the magnetic disks in the radial direction thereof, the reading side head and the writing side head on the rotary positioner with the respective orders in the disposition being equal to each other (the reading side head $7_i$ and the writing side head $10_i$) are in the above-described correspondence, and each of the writing side heads and each of the reading heads in the correspondence are so provided as to position on approximately the same radial positions of the master disk and each side of each of the magnetic disks as being objects of each of the reading side head and each of the writing side heads gaining access thereto, respectively.

A magnetic data embedding system according to the tenth aspect of the invention is a system in which, in the magnetic data embedding system according to any one of the first to the seventh aspects, on the same rotary positioner, one reading side heads is provided on the master disk and a plurality of the writing side heads are disposed in a group at approximately equal intervals on each side of each of the magnetic disks in the radial direction thereof, the reading side head (7) and each of the writing side heads ($10_1$ to $10_4$) on the rotary positioner are in the above-described correspondence, the writing side heads on the rotary positioner with the respective orders in the disposition being equal to one another (with respective subscripts "i" of "$10_i$" being equal to one another) are so provided as to position on approximately the same radial positions of respective sides of the magnetic disks served for writing as being objects of the respective writing side heads gaining access thereto.

A magnetic data embedding system according to the eleventh aspect of the invention includes:

a spindle motor (6);

a master disk (3) as a magnetic disk integrally mounted on a shaft of the spindle motor, the master disk being written with magnetic data on at least one side thereof;

a plurality of magnetic disks served for writing (4) as magnetic disks being objects for writing, the magnetic disks being integrally mounted in a stack on the shaft of the spindle motor;

a reading side head (a read-only head 7, etc.) being provided as a magnetic head for reading the magnetic data on the master disk;

writing side heads (servo heads 10, etc.) each being provided as a magnetic head gaining one to one access to each side of each of the magnetic disks served for writing; and a plurality of rotary positioners (rotary positioners 11A, 11B, etc.) each integrally holding the reading side head and the writing side heads in a stack in being turnable, and being disposed on the periphery of the stacked magnetic disks, each of the writing side heads, corresponding to the reading side head provided on the master disk and mounted on each of the rotary positioners, being so provided as to carry out writing of one of the magnetic data and magnetic data prepared on the basis of the magnetic data, read out by the reading side head, onto the side of the magnetic disk served for writing corresponding to the writing side head, the writing being carried out in parallel with other writing side heads on the same side of the magnetic disk served for writing corresponding thereto and on each of the rotary positioners, with a track range for writing being assigned to each of the writing head.

A magnetic data embedding system according to the twelfth aspect of the invention includes:

a spindle motor (6);

a master disk (3) as a magnetic disk integrally mounted on a shaft of the spindle motor, the master disk being written with servo information (clock patterns PC1, servo patterns PS1, etc.) on at least one side thereof;

a plurality of magnetic disks served for writing (4) as magnetic disks being objects for writing, the magnetic disks being integrally mounted in a stack on the shaft of the spindle motor;

a read-only head (7) being provided as a magnetic head for reading the servo information on the master disk;

a servo head (10) being provided as a magnetic head provided in one to one correspondence on each side of each of the magnetic disks served for writing for carrying out writing one of the servo information and modified servo information prepared on the basis of the servo information (servo patterns PS 2);

a plurality of rotary positioners (11A, 11B, etc.) each integrally holding the read-only head and the servo head in a stack in being turnable, and being disposed on the periphery of the stacked magnetic disks;

a head position control unit (a head position and clock detecting unit 8A, 8B, a servo compensator 12, a power amplifier 13, etc.) provided for each of the rotary positioners, the unit carrying out comparison of a target head position (Rs) and a detected head position (R) to turn the rotary positioner so that the difference between the target head position and the detected head position becomes minimum and bringing the detected head position to be stably settled at the target head position, the target head position being externally given as a radial position on the master disk to be followed up by the read-only head, and the detected head position being taken as a radial position of the read-only head on the master disk, the radial position being obtained from the servo information read out by the read-only head;

a servo pattern generator (9A, 9B, etc.) provided for each of the rotary positioners and transmitting the one of the servo information and the modified servo information obtained from the servo information to each of the servo heads on the side of the same rotary positioner in synchronism with a clock signal (CLK), the clock signal being obtained from the servo information read by the read-only head on the side of the same rotary positioner;

a head position error storing unit (a track position correcting unit 22) storing head position errors ($\Delta\tau$), in the radial direction of the magnetic disk, among the servo heads gaining access to the same side of the magnetic disk served for writing in each of the rotary positioners, the errors being stored for each side of the magnetic disk served for writing; and a track position correcting unit (a track position correcting unit 22) making at least any one of the servo pattern generators transmit one of the servo information and the modified servo information to each of corresponding servo heads, a track address of the information being corrected by using the head position error corresponding to each of the servo heads, each of the servo heads in each of the rotary positioners, with a track range for writing being assigned to the servo head, being made to carry out, in parallel with other servo heads, writing of one of the correct servo information and the correct modified servo information in the track range assigned to the servo head on each side of the magnetic disk served for writing corresponding to the servo head by keeping a correct track space between an adjacent track range.

A magnetic data embedding system according to the thirteenth aspect of the invention is, in the magnetic data embedding system according to the twelfth aspect, made to further include a unit (a track position correcting unit 22) carrying out monitoring of a target head position of the read-only head corresponding to each of the servo heads writing the one of the servo information and the modified servo information, each with a corrected address, by checking the head position error corresponding to each of the servo heads, and allowing each of the servo heads to carry out writing (through a write enable signal 22a) only when each of the servo heads is in the track range assigned thereto.

A magnetic data embedding system according to the fourteenth aspect of the invention is a system in which, in the magnetic data embedding system according to the twelfth or the thirteenth aspect, with a read-only head on any of the rotary positioners (hereinafter referred to as a "first read-only head") being made stably settled on a track (X etc., hereinafter referred to as a "first track") on the master disk determined by a target head position given to the first read-only head by the head position error storing unit, a servo head, as an object of measurement corresponding to the first read-only head, (hereinafter referred to as a "first servo head") writes a specified signal (XB, etc.) on the magnetic disk served for writing, next, a servo head, provided on another rotary positioner (hereinafter referred to as a "second servo head") side and positioned on the side of the magnetic disk served for writing, detects the signal to position the second servo head at the position of the signal, then, in this state, a read-only head corresponding to the second servo head (hereinafter referred to as a "second read-only head") reads out servo information from the master disk, from which information a position (Y, etc.) of a track (hereinafter referred to as a "second track") is detected at which the second read-only head is stably settled on the master disk, and finally, the difference between the positions of the first and second tracks ($\Delta\tau=X-Y$) is stored as a head position error between the first and second servo heads on the side of the magnetic disk served for writing.

A magnetic data embedding system according to the fifteenth aspect of the invention is a system in which, in the magnetic data embedding system according to any one of the twelfth to the fourteenth aspects, the track position correcting unit is a unit that corrects an output of the servo pattern generator (9A in the example) on one side of the rotary positioners provided with servo heads carrying out writing of one of the servo information and the modified servo information, to which heads track ranges adjacent to each other are separately assigned.

Moreover, a magnetic data embedding system according to the sixteenth aspect of the invention is, in the magnetic data embedding system according to any one of the twelfth to the fifteenth aspects, made to further include a unit (a write data memory 16, a track position correcting unit 22) which is provided for each of the servo pattern generators for storing data to be written in a data region (DTA) of the magnetic disk served for writing, provides data (Data) to the servo pattern generator, the data corresponding to an address of one of the servo information and the modified servo information transmitted by the servo generator to each of the servo heads corresponding thereto, and makes writing of the data to the data region corresponding to the address carried out.

A magnetic data embedding system according to the seventeenth aspect of the invention is a system in which, in the magnetic data embedding system according to any one of the first to the sixteenth aspects, the master disk is made to be produced by carrying out writing thereto with any of magnetic heads on the rotary positioner with the master disk being in the stacked state.

Furthermore, a magnetic data embedding system according to the eighteenth aspect of the invention is a system in which, in the magnetic data embedding system according to any one of the first to the sixteenth aspects, the master disk is made to be produced by writing of magnetic information by magnetic printing.

According to the function of the invention, in a magnetic data embedding system, in which a master disk and a plurality of magnetic disks as objects for writing (magnetic disks served for writing) are stacked on a shaft of a spindle motor, and items of servo information read out from the master disk or items of modified servo information prepared on the basis of the read out servo information are written to a plurality of the magnetic disks served for writing in parallel, one rotary positioner or a plurality positioners are disposed around the stacked magnetic disks. Each of the rotary positioners has one or a group of a plurality of read-only heads with the specified number for reading the master disk and one or a group of a plurality of servo heads with the specified number provided for each side of a plurality of magnetic disks served for writing to write the servo information onto the side. The read-only heads and the servo heads are held in a stack and integrally turned by the rotary positioner. The rotary positioners are disposed so that at least a plurality of servo heads are presented on the same side of each of the magnetic disks served for writing for gaining access thereto. This makes a plurality of the servo heads carry out writing on the same side of the magnetic disk served for writing in parallel with one another with their respective track ranges assigned thereto to thereby shorten the writing time of servo information to the magnetic disk served for writing.

Along with this, corrections are carried out about position errors (position differences) in the radial direction of the magnetic disk, which errors are presented among the servo heads provided on respective rotary positioners and positioned on the same side of the magnetic disk served for writing. Moreover, corrections are also carried out about position errors (position differences) in the radial direction of the magnetic disk, which errors are presented among the read-only head and each of a plurality of the servo heads in a correspondence with each other on the same rotary positioner. The corrections are thus carried out so that the servo information is written with the corrections. Hence, a plurality of the servo heads on the same side of the magnetic disk served for writing correctly carry out writing to their respective track regions, writing to which are assigned to the servo heads, for reduction in manufacturing cost of high density and high accuracy magnetic disks.

DESCRIPTION OF THE PREFERRED EMBODIMENTS

FIRST EXAMPLE

Figures 1A, 1B:
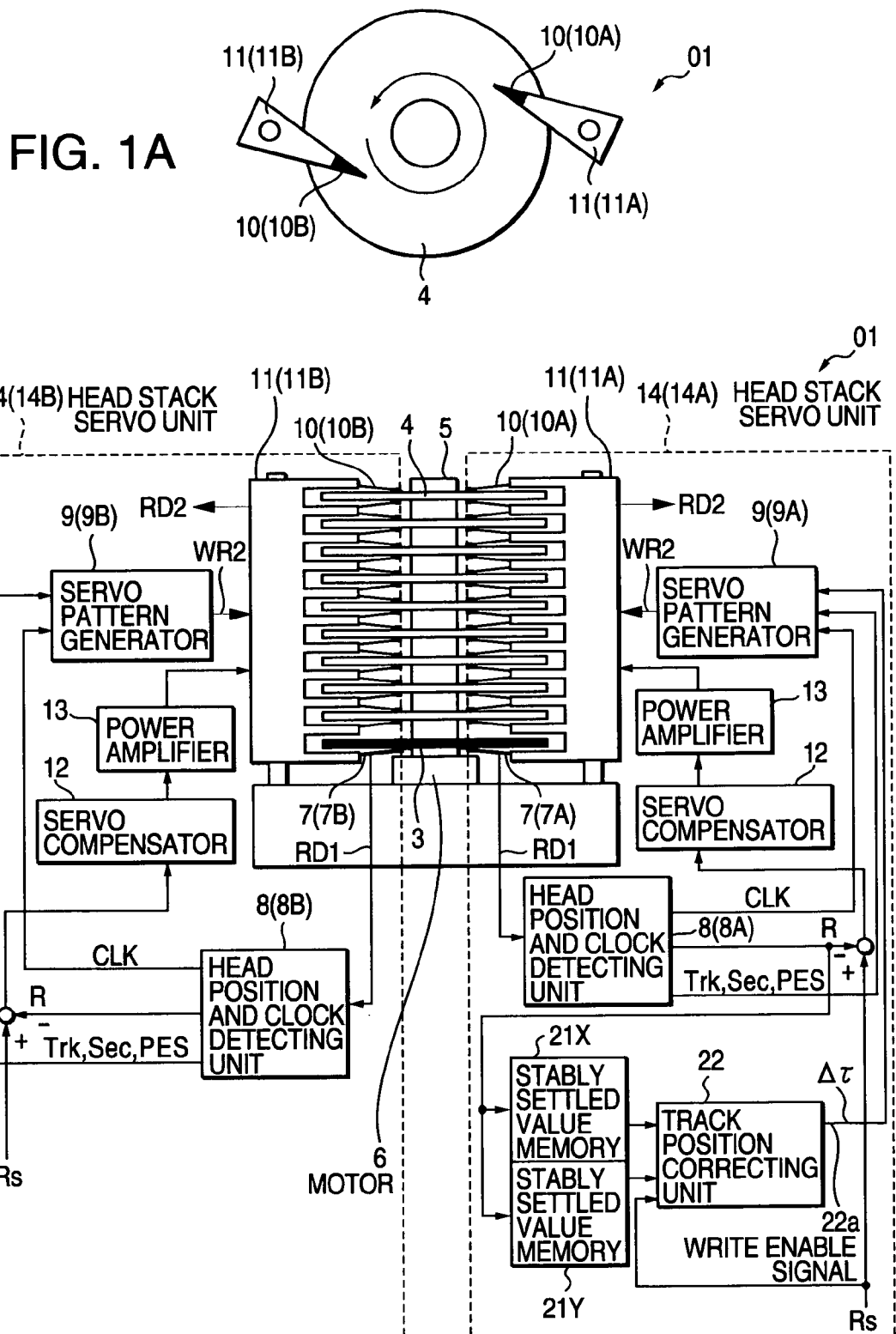
FIGS. 1A and 1B are views showing a schematic arrangement of a magnetic data embedding system as a first example according to the invention.
Figure 3:
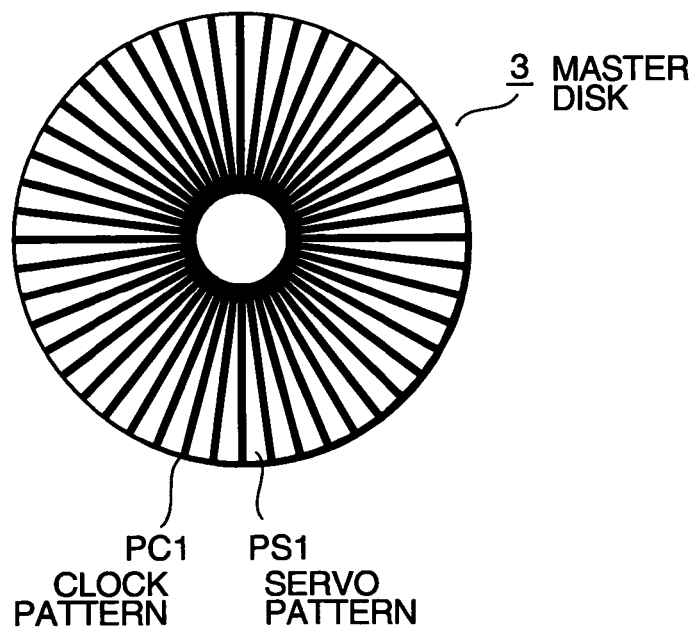
FIG. 3 is a plan view showing a master disk as an example according to the invention.
Figure 4:
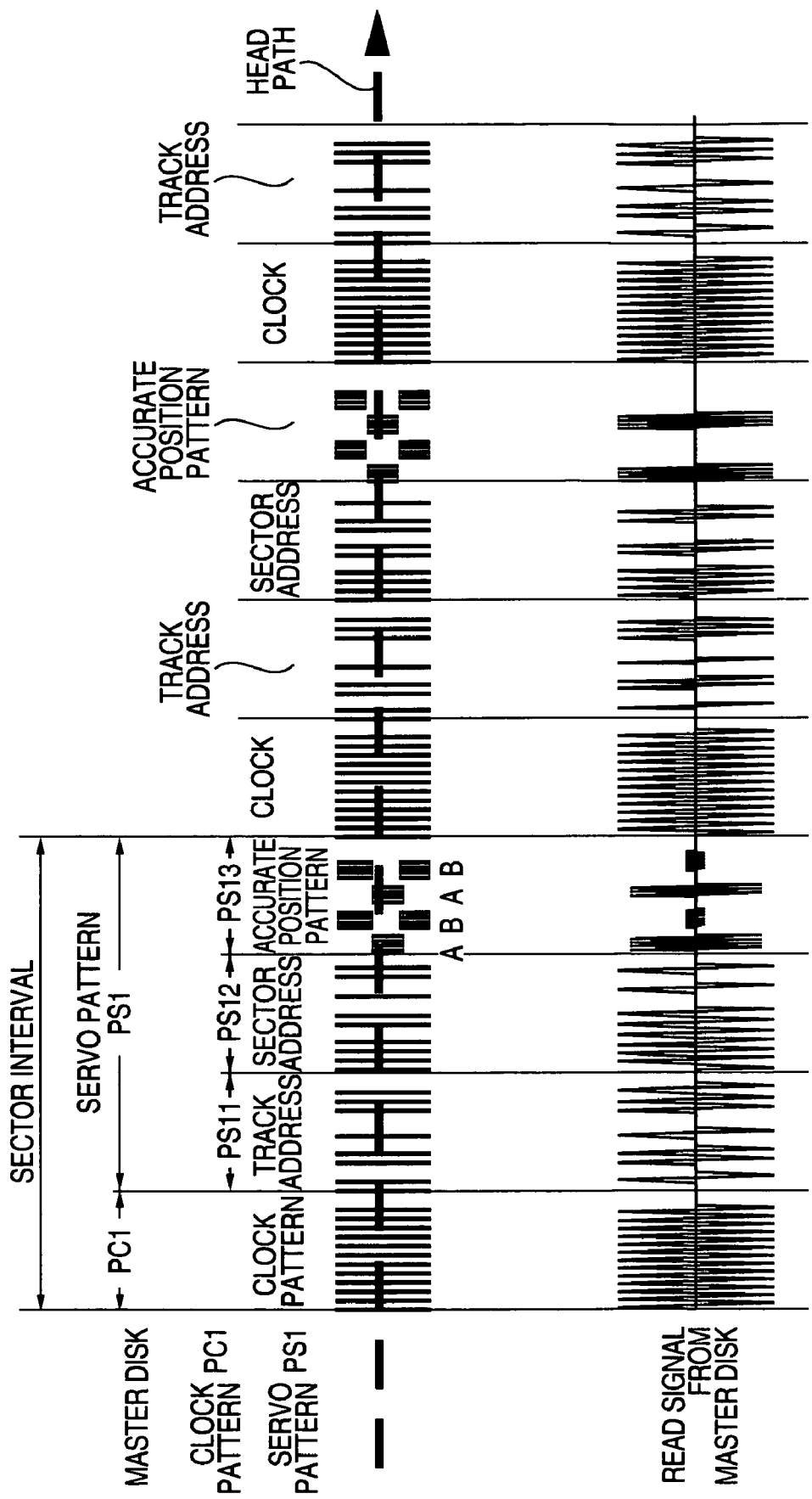
FIG. 4 is a view showing clock pattern sections and servo pattern sections on a master disk as an example according to the invention, and a read signal from the master disk in a comparison.

FIGS. 1A and 1B show an arrangement of a magnetic data embedding system (disk servo writer) 01 in accordance with a first example of the invention. A disk stack unit 5 is integrally mounted onto the shaft of a spindle motor 6 rotating at a high speed. The disk stack unit 5 has one master disk 3 (at the bottom end) and M (M=9 in FIG. 1B) magnetic disks 4. The master disk 3 is a disk on which specified writing, to be described in detail later with reference to FIGS. 3 and 4, is carried out onto the magnetic disks 4.

Moreover, two rotary positioners 11 (identified individually as 11A and 11B in the drawings) are provided for two head stack servo units 14 (identified individually as 14A and 14B), together with respective attached circuits. Each of the rotary positioners 11A and 11B holds one read-only head 7 (7A and 7B) and a plurality of servo heads 10 (10A and 10B), with the heads 7 and 10 being stacked. The read-only heads 7 have direct access to the bottom side of the master disk 3 in this example. Each of the servo heads 10 has direct access to a side of a respective one of the M magnetic disks 4.

Although two of the head stack servo units 14 are provided in the system shown in FIGS. 1A and 1B, additional head stack servo units 14 could be further provided, in general. For example, an additional one can be provided at the twelve o'clock position in the top view shown in FIG. 1A.

Here, the head stack servo unit 14B is provided with the read-only head 7 (7B), a head position and clock detecting unit 8 (8B) and a servo pattern generator 9 (9B). The read-only head 7 (7B) reads out clock patterns PC1 and servo patterns PS1 shown in FIG. 3 from the bottom side of the master disk 3. The head position and clock detecting unit 8 (8B) carries out detection of a detected head position R, representing the actual position of the read-only head 7B, and a clock CLK (that is, a clock signal) on the basis of a read signal RD1 read out by the read-only head 7B. The servo pattern generator 9 (9B) generates servo patterns PS2, which provide items of information on head positions on the magnetic disks 4, in synchronism with the clock.

Figure 2:
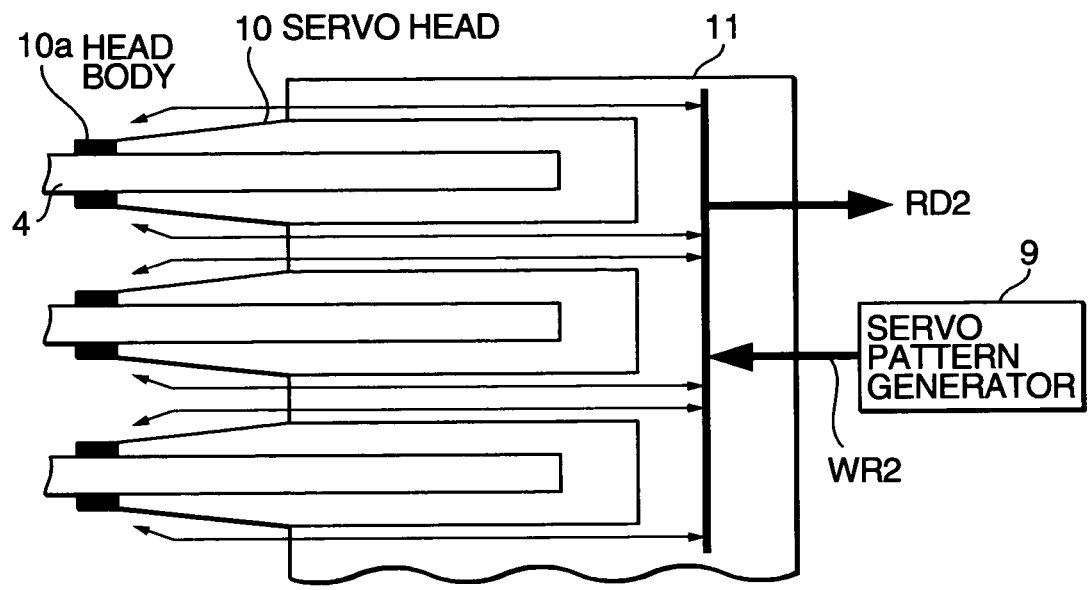
FIG. 2 is an enlarged view showing magnetic head sections and stacked magnetic disks.

Furthermore, there are provided the servo heads 10 (10B), the rotary positioner 11 (11B), a servo compensator 12 and a power amplifier 13. The servo heads 10 (10B) carry out writing and reading of the servo patterns PS2 generated by the servo pattern generator 9B onto and from each side of each of the magnetic disks 4 (see enlarged view shown in FIG. 2). The rotary positioner 11 (11B) carries out rotational movement of the read-only head 7B and the servo heads 110B to position them. The servo compensator 12 obtains a servo compensating value from an error between the detected head position R of the read-only head 7B and a target head position Rs so as to make the error minimum. The power amplifier 13 outputs a driving current for the rotary positioner 11B on the basis of the servo compensating value.

In the rotary positioner 11B, one servo head 10B is mounted at each side of each of the magnetic disks 4 as explained before. One read-only head 7B is mounted at one side of the master disk 3. Each of the heads (the read-only head 7B and the servo heads 10B) on each side of the disks is regarded as having been adjusted so that the head can gain access to the same radius on the master disk 3 or each of the magnetic disks 4.

Moreover, the head stack servo unit 14A, like the above-described servo unit 14B, is vided with the read-only head 7 (specifically 7A), a head position and clock detecting unit 8 (8A), and a servo pattern generator 9 (9A). The read-only head 7 (7A) reads out clock patterns PC1 and servo patterns PS1 from the bottom side of the master disk 3. The head position and clock detecting unit 8 (8A) carries out detection of a detected head position R, representing the actual position of the read-only head 7A, and a clock CLK on the basis of a read signal RD1 read out by the read-only head 7A. The servo pattern generator 9 (9A) generates servo patterns PS2, which provide items of information on head positions on the magnetic disks 4, in synchronism with the clock.

Along with this, there are provided the servo heads 10 (10A), the rotary positioner 11 (11A), a servo compensator 12, and a power amplifier 13. The servo heads 10 (10A) carry out writing and reading of the servo patterns PS2 generated by the servo pattern generator 9A onto and from each side of each of the magnetic disks 4 (see enlarged view shown in FIG. 2). The rotary positioner 11 (11A) carries out rotational movement of the read-only head 7A and the servo heads 10A to position them. The servo compensator 12 obtains a servo compensating value from an error between the detected head position R of the read-only head 7A and a target head position Rs so as to make the error minimum. The power amplifier 13 outputs a driving current for the rotary positioner 11A on the basis of the servo compensating value.

Furthermore, the head stack servo unit 14A is provided with stably settled value memories 21X and 21Y, and a track position correcting unit 22. The stably settled value memories 21X and 21Y, in a procedure that will be described later for correcting any head position error between servo heads 10A and 10B in the head stack servo units 14A and 14B, store stably settled respective positions of the read-only head 7A (each being a detected head position R after the transient state in positioning control has settled, so that the head position is stabilized) that correspond to the positions of the servo heads 10A and 10B on the same side of each of the magnetic disks 4. The track position correcting unit 22 obtains, for each side of each of the magnetic disks 4, the difference between the stably settled positions of the read-only head 7A that are respectively stored in the two memories 21X and 21Y. The difference corresponds to a difference between the positions of the servo heads 10A and 10B on the same side of each of the magnetic disks 4.

Also in the rotary positioner 11A, one servo head 10A is mounted at each side of each of the magnetic disks 4. One read-only head 7A is mounted at one side of the master disk 3. Moreover, each of the heads (the read-only head 7A and the servo heads 10A) on each side of each disk is regarded as having been adjusted so that the head can gain access to the same radius on the master disk 3 or each of the magnetic disks 4.

FIG. 4 shows an example of the detailed arrangements of a part of the patterns written on a track in the master disk 3. Namely, there are shown an example of specific arrangements of a clock pattern PC1 and a servo pattern PS1 and an example of the waveform of a read signal RD1 read from these patterns. In the read signal RD1, a positive pulse is reproduced at the left end of the servo pattern PS1, while at the right end, a negative pulse is reproduced. It should be noted that, for the sake of convenient illustration, FIG. 4 shows only the clock patterns PC1 and the servo patterns PS1, and leaves out space (corresponding in extent to data regions that will appear on the magnetic disks 4) that is also present in each sector interval of the tracks in the present embodiment.

As shown in FIG. 3 and FIG. 4, a highly accurate clock pattern PC1 and a servo pattern PS1 are written to each sector of the master disk 3 by magnetic printing or by a magnetic head. In the example, the servo pattern PS1 in each sector includes a pattern PS11 for a track address (also referred to as a track No. and corresponding to later-explained Trk), a pattern PS12 for a sector address (also referred to as a sector No. and corresponding to later-explained Sec) and a pattern PS13 for an accurate position (corresponding to later-explained PES) in the order in the scanning direction of the head (shown as a broken line with an arrow as the path of the head).

The accurate position pattern PS13 is a magnetic pattern presented as a staggered pattern employed in most magnetic disk systems. The amplitude of a signal reproduced from the section A or the section B in PS13 is changed depending on the radial position of the path of a magnetic head. This is a magnetic pattern applied to obtain an accurate radial position (simply referred to as the accurate position) of the head in the track by calculating the PES (Position Error Signal) given by the following expression:

PES=(amplitude of signal in section A−amplitude of signal in section B)/(amplitude of signal in section A+amplitude of signal in section B).

Incidentally, the written contents on the master disk 3 are limited to the clock pattern PC1 and the servo pattern PS1 in each sector. There are no data regions DTA, unlike the servo patterns PS2 written to the magnetic disks 4. Therefore, the clock patterns PC1 and the servo patterns PS1 can be written to the whole side of the master disk 3 in some embodiments to make it possible to enhance the positioning accuracy of the head. Such an arrangement is shown in FIG. 3. However, it is also possible to reduce the number of sectors in each track so that space can be left between the patterns PC1 and PS1 in one sector and the patterns PC1 and PS1 in the next sector. This latter arrangement is employed in the present embodiment.

Figure 5:
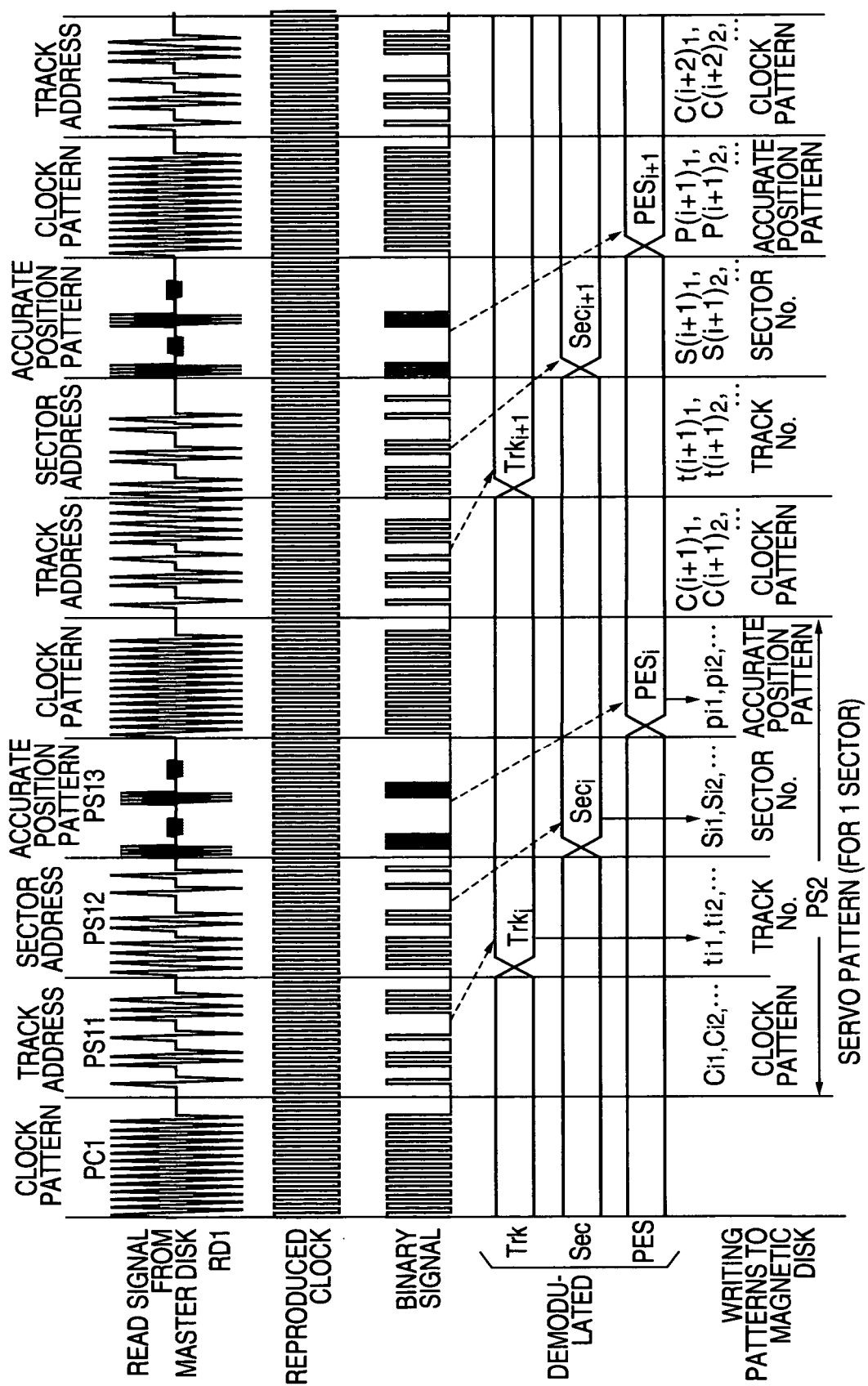
FIG. 5 is a timing chart showing an example of the operation of the magnetic data embedding system shown in FIGS. 1A and 1B as the first example according to the invention.
Figure 6A:
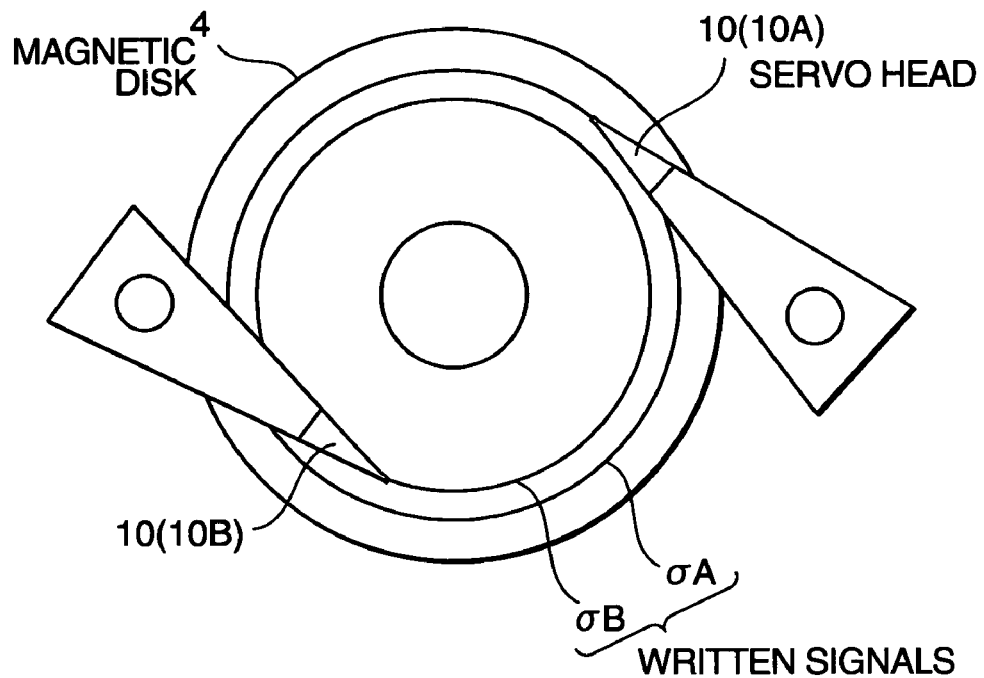
FIG. 6A is an explanatory view showing the state of a magnetic disk in a second step of a procedure for detecting a position error (inter-positioner head position error) between servo heads positioned on the same side (to or bottom) of the magnetic disks and separately mounted on a plurality of rotary positioners.
Figure 6B:
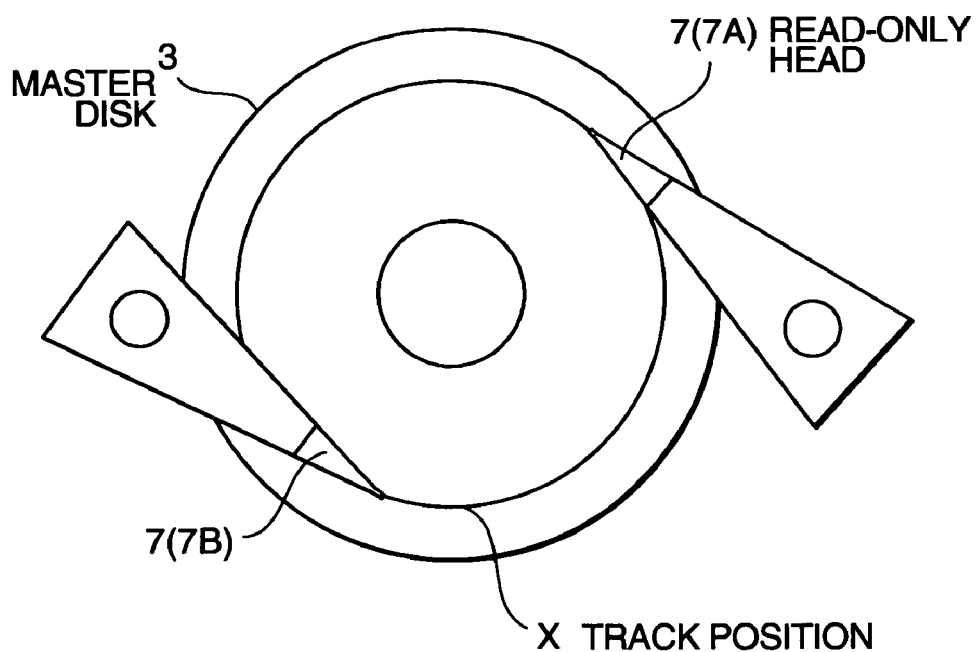
FIG. 6B is an explanatory view showing the state of a master disk in a first step of the above procedure for detecting the inter-positioner head position error.

FIG. 5 is an example of a timing chart showing the operation of the magnetic embedding system 01 shown in FIG. 1. In FIG. 5, there is shown the read signal RD1 from the master disk 3, the same one that is shown in FIG. 4. Moreover, there are shown a clock CLK regenerated from the clock pattern PC1 in the read signal RD1 and a binary signal converted from the read signal RD1. Furthermore, there are shown a track address Trk, a sector address Sec, and the position error signal PES each of which is detected (demodulated) from the binary signal. In addition, there are also shown writing patterns to the magnetic disk 4.

Next, the operation in the system shown in FIGS. 1A and 1B will be explained with reference to FIG. 5. The operation is basically carried out as follows. In the head stack servo unit 14A, the clock patterns PC1 and the servo patterns PS1, written in the master disk 3, are read out through the read-only head 7A to detect the actual position R of the read-only head 7A. The reading is carried out in a track range assigned to the servo unit 14A carrying out writing to each of the magnetic disks 4. A signal for the error between the detected head position R and the target head position Rs is fed back through the servo compensator 12 and the power amplifier 13. This makes the stably settled position of the read-only head 7A, and hence the position of each servo head 10A coaxially provided with the head 7A in the radial direction of the magnetic disks 4, follow up the target head position Rs. With the position of the head 7A and the heads 10A thus made to follow up the target position, each of the servo patterns PS2 is written in parallel with the others by the servo heads 10A at each side of each of the magnetic disks 4. The same operation is carried out also in the head stack servo unit 14B with the read-only head 7B and the servo heads 10B.

In the above following up state, the head position and clock detecting unit 8 reproduces the clock CLK (FIG. 5) from the clock pattern PC1 included in the read signal RD1 (FIG. 5) obtained from the master disk 3. In synchronism with the clock CLK, the read signal RD1 is subjected to binarization processing obtain the binary signal. From the binary signal, the track address $Trk_i$, the sector address $Sec_i$ and the position error signal $PES_i$ are detected. Here, the subscript "i" added to each of the reference characters Trk, Sec, and PES corresponds to the order of scanning for each sector on the track. It should therefore be kept in mind that "$Trk_i$" and "$Tri^{i+1}$" in FIG. 5 refer to different portions of the same track, not to different tracks.

The detected head position R as the stably settled position of the read-only head 7 can be obtained from the track address $Trk_i$, the sector address $Sec_i$ and the position error signal $PES_i$ as follows by letting the space between the tracks be W.

[stably settled position R at sector address $Sec_i$]
$= Trk_i \times W + PES_i$.

On the basis of the track address Trk, the sector address Sec, and the position error signal PES detected by the head position and clock detecting unit 8, the servo pattern generator 9 generates clock patterns $c_{i1}, c_{i2}, c_{i3}, \ldots$, track address patterns $t_{i1}, t_{i2}, t_{i3}, \ldots$, sector address patterns $s_{i1}, s_{i2}, s_{i3}, \ldots$, and position error signal patterns $p_{i1}, p_{i2}, p_{i3}, \ldots$ as writing patterns to the magnetic disk 4 shown in FIG. 5. The patterns are written to corresponding regions in the corresponding servo patterns PS2 in the magnetic disks 4 through the servo heads 10.

The rotary positioners 11A and 11B carry out the above operation in parallel, with their respective track ranges for writing assigned to them. In this way, writing is carried out by N head stack servo units in parallel. Therefore, the time for carrying out servo writing is shortened to 1/N.

Incidentally, among the stacked read-only head 7A and the servo heads 10A, and among the stacked read-only head 7B and the servo heads 10A, although being within several micrometers, there may exist position errors produced when the heads are attached or replaced. That is, even if careful attention is paid to accuracy when the servo heads are attached or replaced, it is difficult to make the servo heads 10A at the top sides of the magnetic disks 4 coincide precisely with the servo heads 10A at the bottom sides of the disks 4 (this also applies for the servo heads 10B, of course), and so a position difference of several micrometers may exist between the top and bottom servo heads.

The space between two tracks on one side of a magnetic disk is typically 1 μm or less. Therefore, at the boundary between the two track ranges assigned, respectively, to the servo heads 10A and 10B for writing on the same side of the magnetic disks, it is necessary for each of the servo heads 10A and 10B to accurately keep the track space within 1 μm or less with respect to the track in the other region for carrying out writing of servo information in the assigned track range. [reposition?:} That is, the servo heads at the top sides of the magnetic disks 4 may have a position difference with respect to the servo heads at the bottom side. In order to perform this, the writing must be carried out by correcting the position error arising between the servo heads 10A and 10B on the same side of the magnetic disks.

With reference to FIGS. 6A, 6B, 7A and 7B, an example will now be explained of a procedure for correcting a position error between the servo heads 10A and the servo heads 10B on the same side of the magnetic disks 4 (the tops ides, for instance). The heads 10A are carried by the stack servo unit 14A and the heads 10B are carried by the stack servo unit 14B.

First, by the following steps, a position error between the servo heads 10A and 10B on the same side (top, for example) of the magnetic disks 4.

Step 1. First, the target position Rs for each of the read-only heads 7A the head stack servo unit 14A and the read-only heads 7B of the head stack servo unit 14B is taken as the same track position X. Then, the read-only heads 7A and 7B are made to position at the track position X (see FIG. 6B).

At this time, the stably settled position of the read-only heads 7A is detected from the master disk 3 to confirm that the stably settled position is the track position X. The stably settled value is then stored in the stably settled value memory 21X in FIG. 1.

Step 2. Next, with the stably settled positions of the read-only heads 7A and 7B being set at the track position X, by the servo heads 10A and 10B, marking signals (for example, constant frequency signals) σA and σB are written on one side (top, for example) of the magnetic disks 4 during one revolution (see FIG. 6A). Here, an example is shown in which the position of the signal σA lies outside the position of the signal σB as shown in the figure.

Step 3. Following this, the servo heads 10A are moved to be made stably settled at the position of the signal σB written by the servo head 10B (see FIG. 7A). This can, for example, be performed as follows. Namely, while changing the target head position Rs of the read-only head 7A, the servo heads 10A are gradually moved together with the read-only head 7A on the basis of the position information obtained from the master disk 3 through the read-only head 7A. The positioning of the servo heads 10A is carried out with an output signal (a read signal RD 2) from the servo head 10A being until the intensity of the signal observed as the marking signal σB (the reproduced constant frequency signal) becomes maximum. The maximum point of the intensity can be derived by an optimization approach such as the hill-climbing method.

Figure 7A:
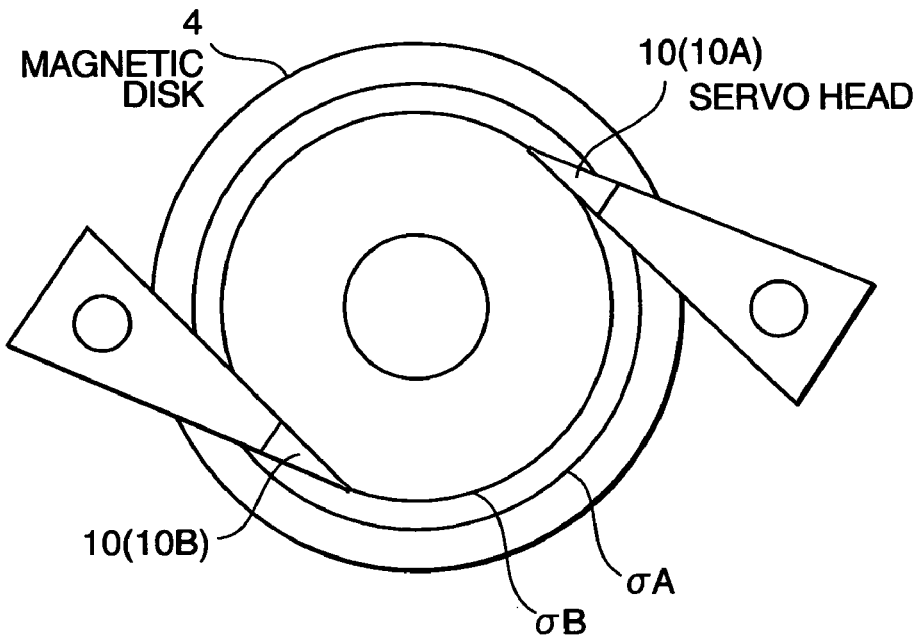
FIG. 7A is an explanatory view showing a state of a magnetic disk in a third step subsequent to the second step shown in FIG. 6A.
Figure 7B:
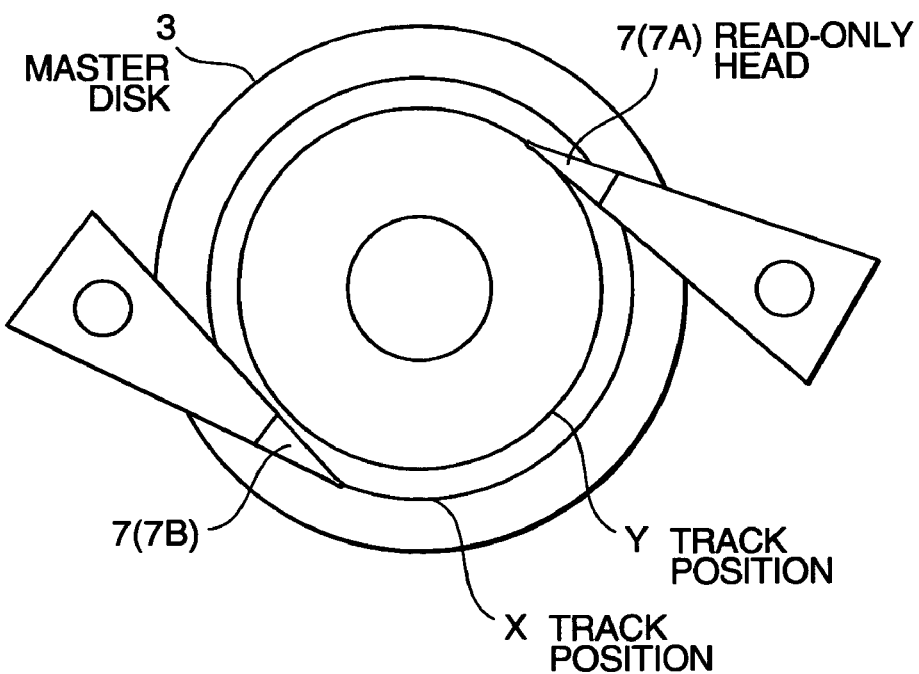
FIG. 7B is an explanatory view showing the state of the master disk in a fourth step, subsequent to the third step shown in FIG. 7A.

Step 4. In the state of the step 3, the stably settled position R of the read-only head 7A on the master disk 3 is obtained by the head position and clock detecting unit 8A (see FIG. 7B). The thus-obtained stably settled position R is taken as the track position Y to be stored in the stably settled value memory 21Y. In the example, as shown in FIG. 7B, the track position Y is located inside the track position X. Then, by means of the track position correcting unit 22, the difference Δτ between the stably settled position (the track position X) of the read-only head 7A stored in the memory 21X and the stably settled position (the track position Y) of the read-only head 7A stored in the memory 21Y is obtained as expressed by the following expression:

(difference Δτ between track positions) = $X - Y$

= (head position error)

= (track correction value).

The difference Δτ between track positions is equal to the position error between the servo heads 10A and 10B on the side of the magnetic discs that has been measured. In the same way, a position error Δτ between the servo heads 10A and 10B on the other side (bottom, for example) the magnetic disks 4 is obtained.

The next thing to be explained will be a procedure by which the servo heads 10A and 10B correctly write items of servo information in their respectively assigned track regions by correcting the position error Δτ between the servo heads 10A and 10B, in the example shown in FIGS. 6A to 7B.

Assume that the total number of tracks on one side of each magnetic disk 4 is k (an integer). The task of writing tracks in a range from track No. 1 to track No. j (where j is taken as an integer smaller than k), arranged in the order from the inside of one side (for, for example) of the magnetic disks 4, is regarded as being assigned to the servo head 10B, and writing to the track range from track No. (j+1) to track No. k is regarded as being assigned to the servo head 10A.

The writing of items of servo information to the relevant side (top, for example) of the magnetic disks 4 by the servo heads 10B is regarded as being carried out with the target head position Rs to the read-only head 7B being set one by one to the tracks ranging from track No. 1 to track No. j on the master disk 3.

In order to make the servo heads 10A gain access to any of correct positions of the tracks ranging from track No. (j+1) to track No. k on the relevant side of the magnetic disks 4, the target head position Rs for the read-only heads 7A must be taken as ranging from track No. [(j+1)–Δτ] to track No. (k–Δτ). The servo heads 10A must carry out writing with a servo pattern the same as the servo pattern PS2 read out by the read-only head 7A at any of the tracks from No. (j+1) to No. k on the master disk 3.

Thus, while the read-only head 7A is made to gain access to any one of the tracks from No. [(j+1)–Δτ] to track No. (k–Δτ) on the master disk 3, the track position correcting unit 22 transmits a signal reflecting the difference Δτ between track positions to the servo pattern generator 9A. The servo pattern generator 9A corrects the track address Trk outputted from the head position and clock detecting unit 8A (that is, a track address Trk based on the servo information read out by the read-only head 7A) by the difference between track positions (also referred to as the track correction value) Δτ (in this example the correction is addition), and makes the corrected track address Trk written to the magnetic disk 4.

The correction of the track address must be carried out for both of the sides (top and bottom) of the magnetic disks 4. Furthermore, the access by the read-only head 7A to the master disk 3, carried out for track ranges thereon corresponding to the track ranges assigned to the respective servo heads 10A for writing on both sides of the magnetic disks 4, must be completed in one operation.

Therefore, the read-only head 7A must gain access to the master disk 3 in the track range thereon that allows the servo heads 10A to carry out writing in the track ranges assigned to the respective heads 10A on both of the sides of the magnetic disks 4. Moreover, during the access, no servo heads 10A are allowed to enter any of track regions for the servo heads 10B and carry out writing thereto.

Thus, the track position correcting unit 22 checks the target head position Rs to the read-only head 7A and a track correction value $\Delta\tau$ on each side of each of the magnetic disks 4. For each side of each of the magnetic disks 4, only when the result of the check provides a decision that the target head position Rs corresponds to the position of the servo head 10A in the track range in which writing is allowed, a write enable signal 22a is transmitted from the track position correcting unit 22 to the servo pattern generator 9A.

When the number of the head stack servo units 14 is greater than the two shown in FIGS. 1A and 1B, the additional unit or units are made to have a similar arrangement to that of the head stack servo unit 14A, and a head position error $\Delta\tau$, as described above, is obtained between the servo units 14 and used to correct position errors while servo information is written in assigned track ranges that are adjacent to each other.

For preventing the servo heads 10A and 10B from carrying out erroneous writing that is out of the respective track ranges assigned thereto, a following unit can be provided independently of the above-explained way. The unit, as will be described later with respect to example 3, monitors respective track addresses of items of servo information immediately before the actual writing by the servo heads 10A and 10B. When a monitored track address is found to be out of the track range assigned to the servo head 10A or 10B beforehand, the writing of the servo information to the track address is inhibited. In the example shown in FIG. 1, such a unit can be provided in the servo pattern generator 9A.

SECOND EXAMPLE

Figure 8A:
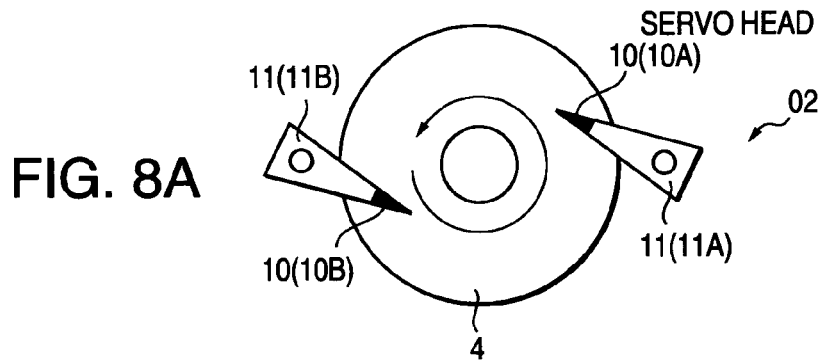
FIGS. 8A and 8B are views showing a schematic arrangement of a magnetic data embedding system as a second example according to the invention.
Figure 8B:
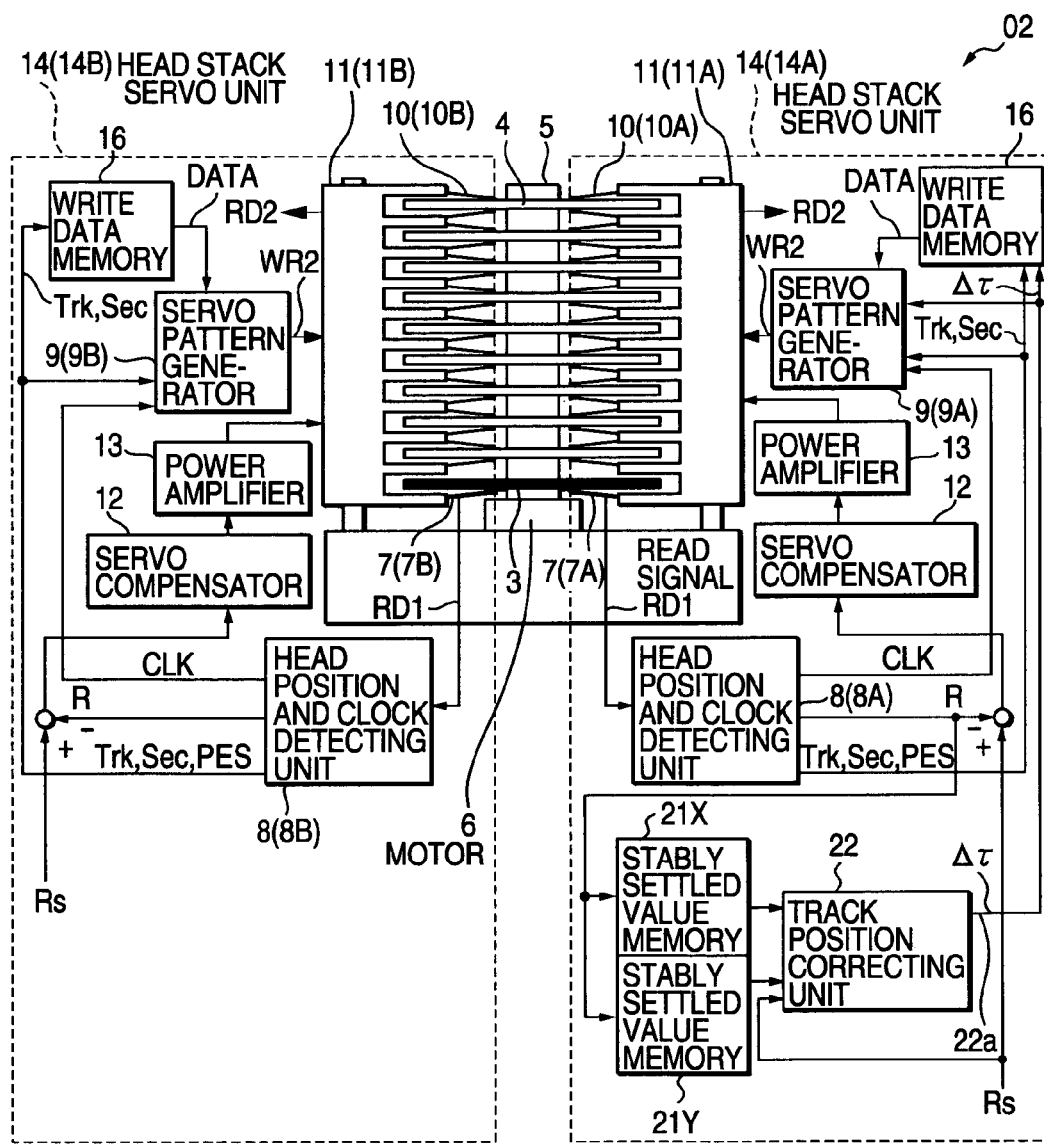
Figure 9:
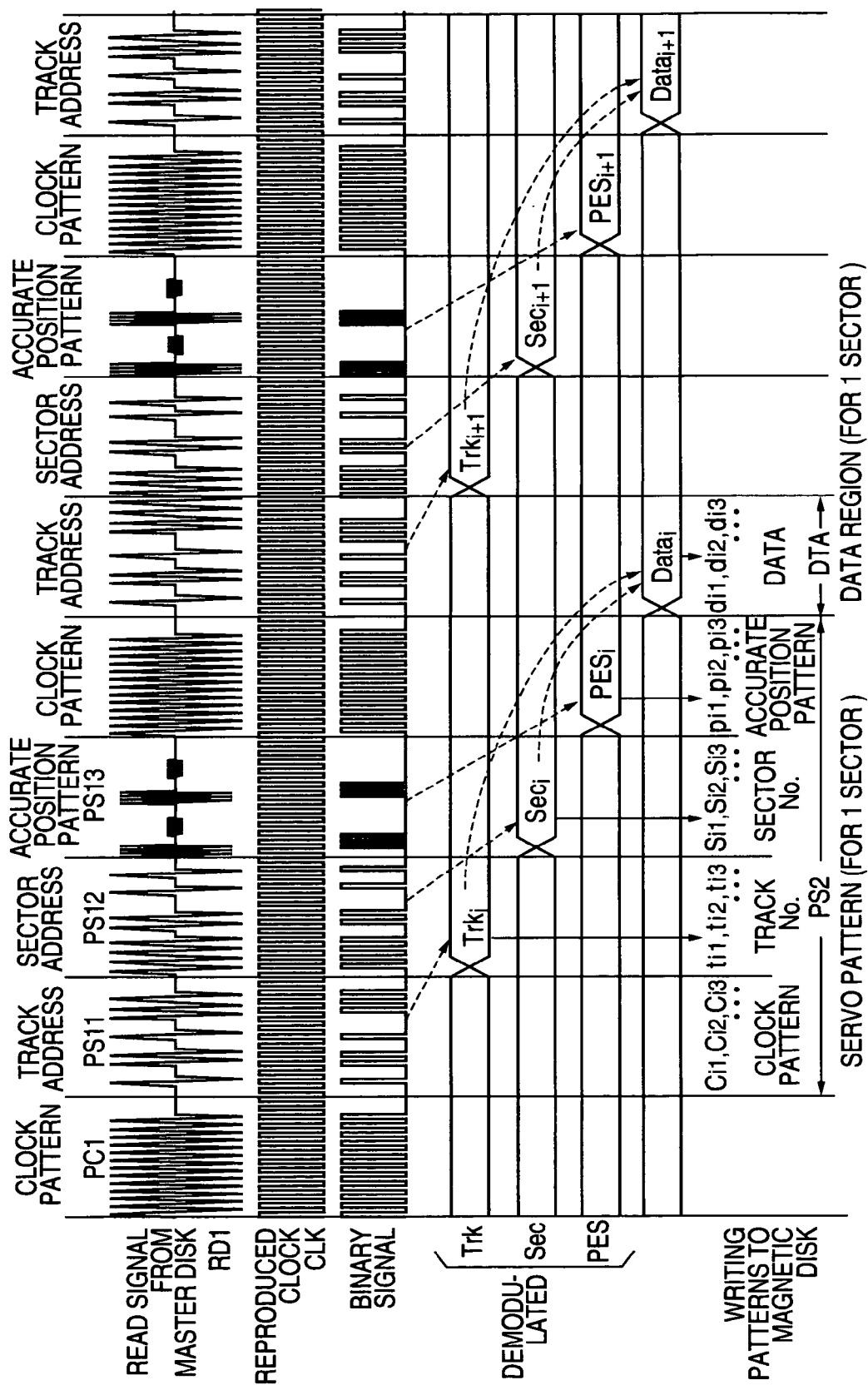
FIG. 9 is a timing chart showing an example of the operation of the magnetic data embedding system in accordance with the second example of the invention.

FIGS. 8A and 8B show a magnetic data embedding system (disk servo writer) 02 in accordance with a second example of the invention, and FIG. 9 is a timing chart showing an example of the operation of the system shown in FIGS. 8A and 8B.

The difference between the system in this second example and the system in the first example shown in FIGS. 1A and 1B is that the system in the second example has a write data memory 16 in each of the head stack servo units 14A and 14B. A track address Trk and a sector address Sec detected by the head position and clock detecting unit 8 (identified individually as 8a and 8B) are transmitted from the unit 8 to the write data memory 1b. Moreover, there is a difference between the timing chart in the second example (shown in FIG. 9) and that of the first example (shown in FIG. 5). As shown by the demodulated signals Trk, Sec and PES, and the writing patterns to the magnetic disk in the chart of FIG. 9, in a timing subsequent to writing to the region of the servo pattern PS2 (in one sector) on the magnetic disks 4 carried out with the same writing patterns as those in FIG. 5 ($c_{i1}$, $c_{i2}$, $c_{i3}$, . . . , $t_{i1}$, $t_{i2}$, $t_{i3}$, . . . , $s_{i1}$, $s_{i2}$, $s_{i3}$, . . . , $p_{i1}$, $p_{i2}$, $p_{i3}$, . . . ), additional writing with writing patterns $d_{i1}$, $d_{i2}$, $d_{i3}$, . . . , of data Data$_i$ is carried out to a data region DTA in the same sector.

Here, in an ideal state in which no position error $\Delta\tau$ as explained in the first example is presented between servo heads 10A and 10B on the same side of a magnetic disks 4, the write data memory 16, on the basis of the track address Trk and the sector address Sec detected by the head position and clock detecting unit 8 and transmitted therefrom, outputs a data Data required to be written in the track and the sector with the detected addresses on the magnetic disks 4. The outputted data Data is transmitted to the servo pattern generator 9.

The servo pattern generator 9, on the basis of the data Data transmitted from the write data memory 16, generates writing patterns ($d_{i1}$, $d_{i2}$, $d_{i3}$, . . . ) to be written to the data regions DTA in the magnetic disks 4. Furthermore, on the basis of the track address Trk, the sector address Sec and a position error signal PES detected by the head position and clock detecting unit 8, the servo pattern generator 9 generates writing patterns ($c_{i1}$, $c_{i2}$, $c_{i3}$, . . . , $t_{i1}$, $t_{i2}$, $t_{i3}$, . . . , $s_{i1}$, $s_{i2}$, $s_{i3}$, . . . , $p_{i1}$, $p_{i2}$, $p_{i3}$, . . . ) to be written to a region of a servo pattern PS2. The writing patterns and the writing patterns based on the data Data are written to the region of the servo pattern PS2 and the additional data region DTA, respectively, in the track and sector with the above detected address on the magnetic disks 4.

However, when a position error (a track correction value) $\Delta\tau$ is presented between the servo heads 10A and 10B, the servo pattern generator 9A must provide a track address Trk in the above various writing patterns to be written to the magnetic disks 4 as a track address Trk that has been corrected by the track correction value $\Delta\tau$. Moreover, writing patterns that are written to the data regions DTA of the magnetic disks 4 must be prepared from data Data based on the track address Trk corrected by the track correction value $\Delta\tau$ and the sector address Sec as detected by the head position and clock detecting unit 8.

Therefore, the track correction value $\Delta\tau$ and a write enable signal 22a are transmitted from the track position correcting unit 22 to the servo pattern generator 9A. In addition to this, the track correction value $\Delta\tau$ is transmitted also to the write data memory 16 so that data to be written to the data region DTA of the magnetic disks 4 are provided as data with a corrected track address.

The other operations are the same as those in the first example and the explanation thereof will be omitted.

THIRD EXAMPLE

Figure 10A:
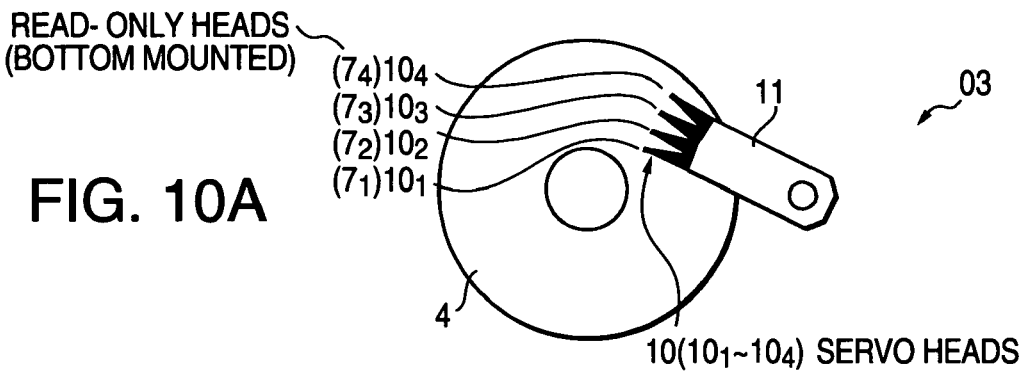
FIGS. 10A and 10B are views showing a schematic arrangement of a magnetic data embedding system as a third example according to the invention.
Figure 10B:
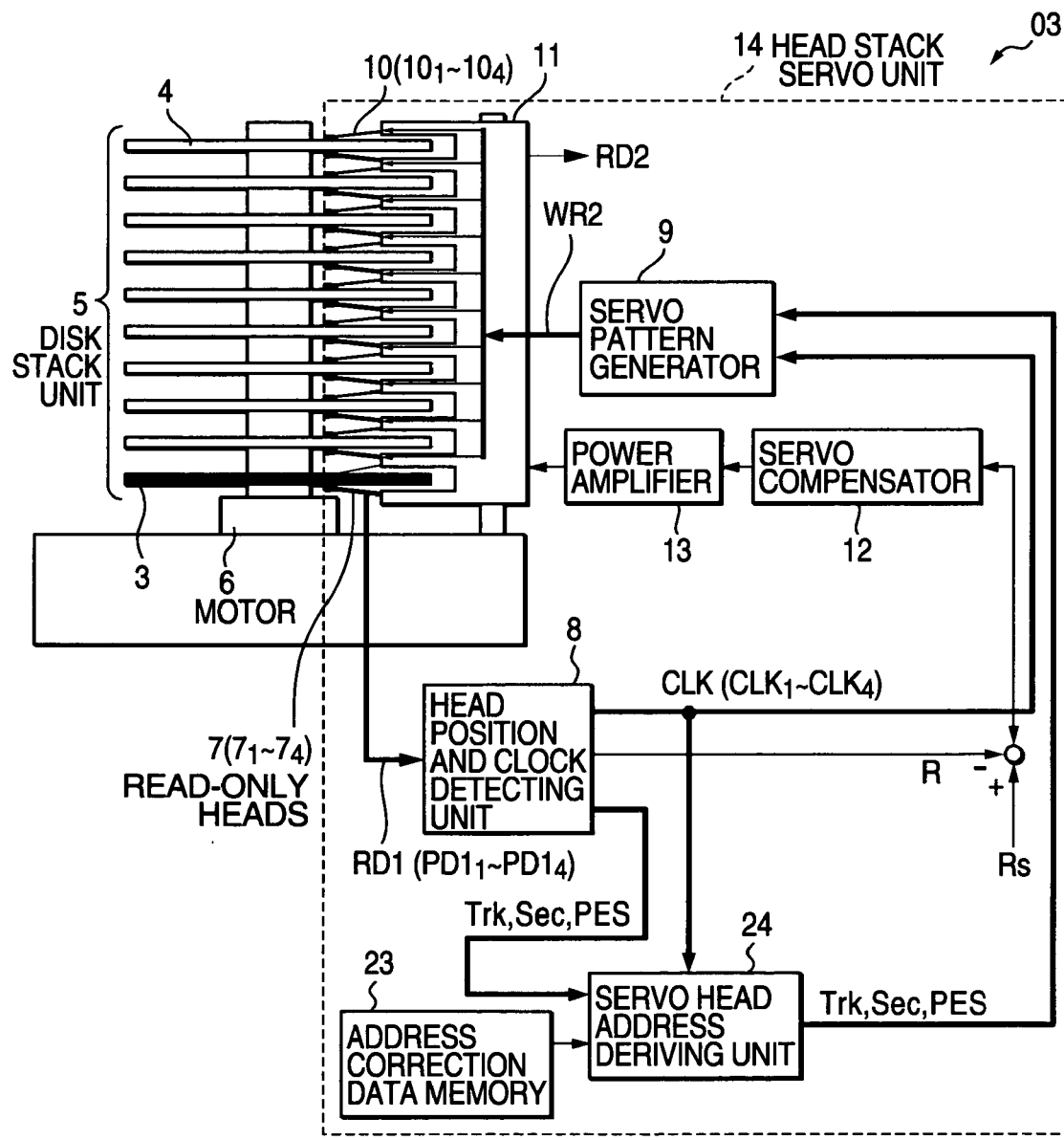

FIGS. 10A and 10B show a magnetic data embedding system (disk servo writer) 03 in accordance with a third example of the invention. One of the major differences between the system in this third example and the system in the first example (shown in FIG. 1) is that the system in the third example is provided with a group of N (four, $10_1$ to $10_4$ in FIG. 10A and other drawings) servo heads disposed on each side of each of the magnetic disks 4. The N servo heads that are disposed at each side of a magnetic disk 4 are arranged approximately in the radial direction of the magnetic disk 4 in a fan-like arrangement at equal intervals, each gaining access to the side of the magnetic disk 4.

Figure 12A:
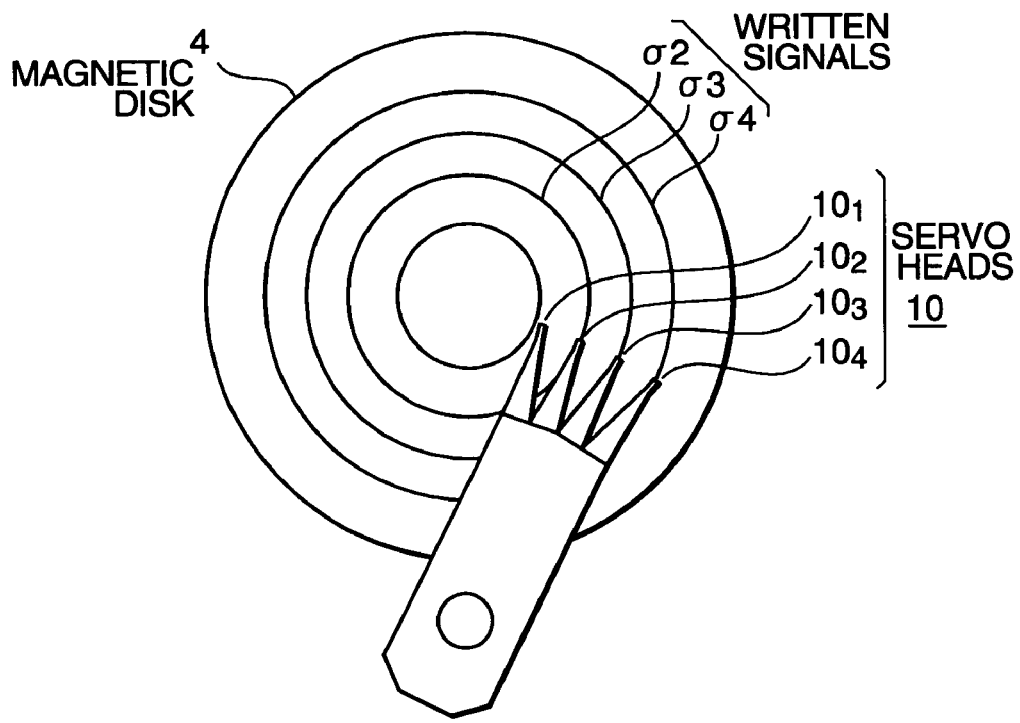
FIG. 12A is an explanatory view showing the state of a magnetic disk in a first step of a procedure for detecting an in-positioner head position error in the magnetic data embedding systems in accordance with the third and fourth examples, which are shown in FIGS. 10A and 10B and in FIGS. 11A and 11B, respectively.
Figure 12B:
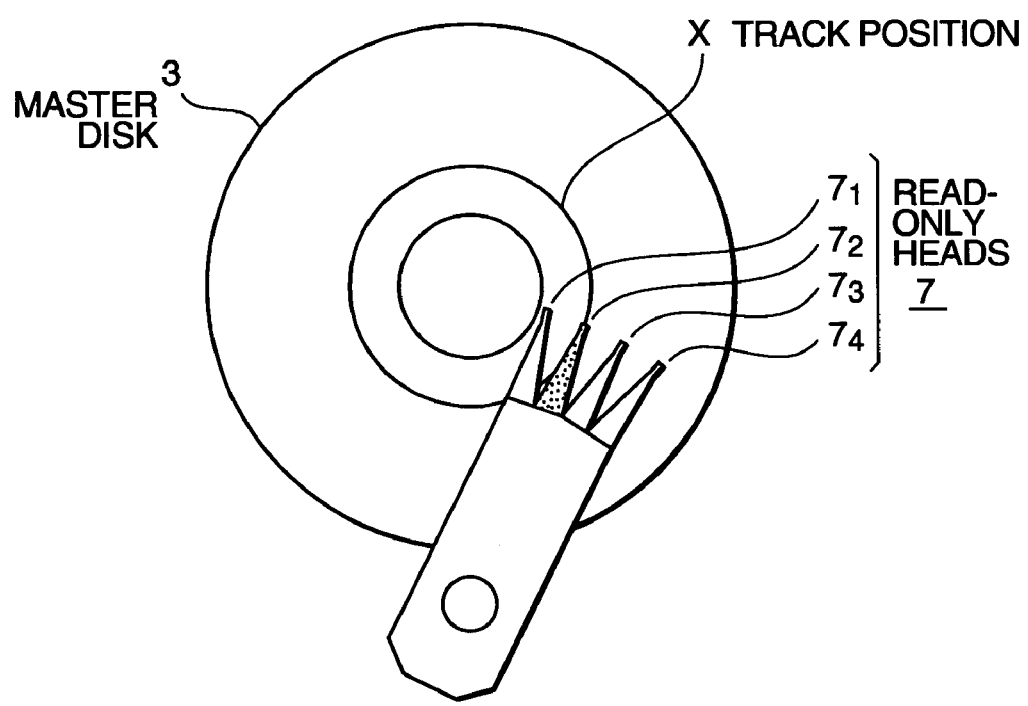
FIG. 12B is an explanatory view showing the state of a master disk in the first step.
Figure 13A:
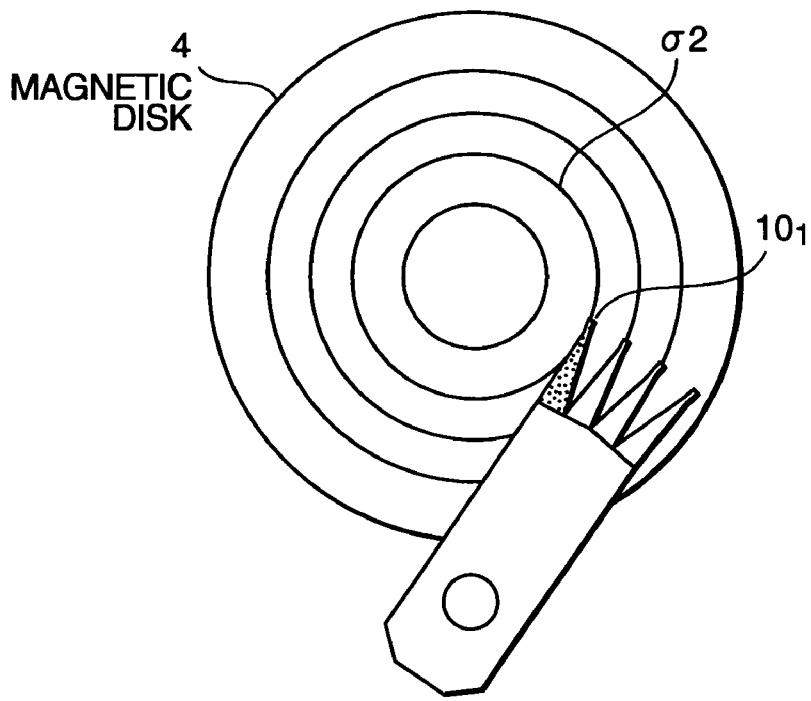
FIG. 13A is an explanatory view showing the state of the magnetic disk in a second step subsequent to the first step 1 shown in FIG. 12A and FIG. 12B.
Figure 13B:
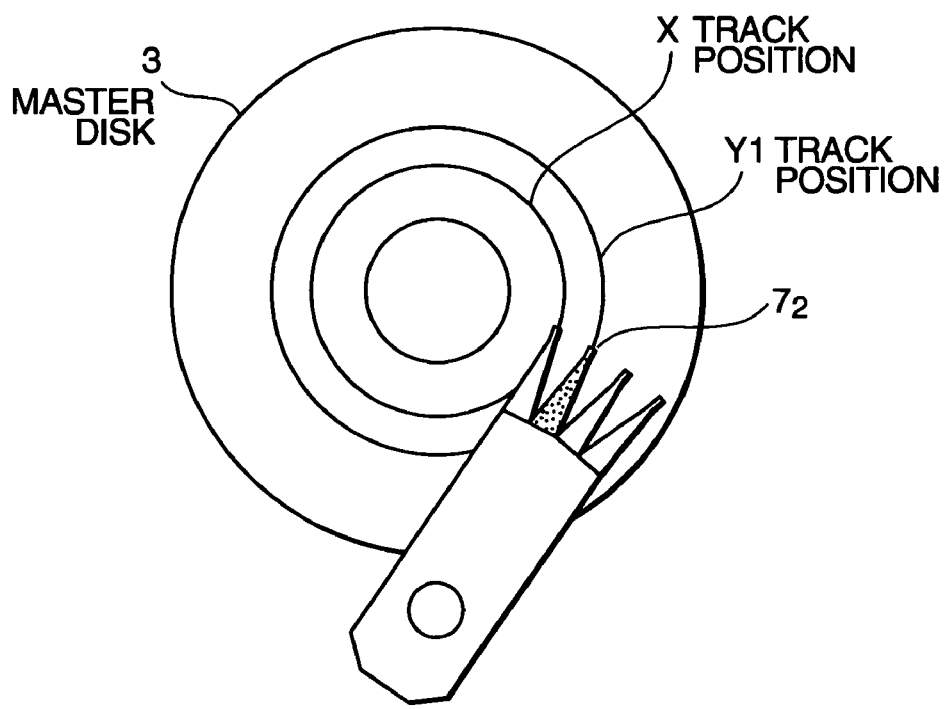
FIG. 13B is an explanatory view showing a state of the master disk in the step 2.
Figure 14A:
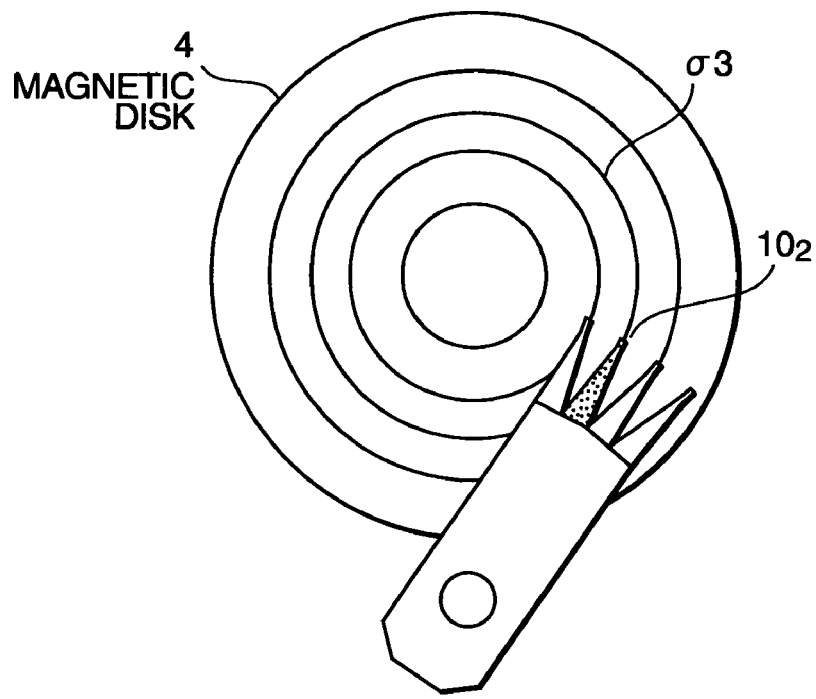
FIG. 14A is an explanatory view showing the state of the magnetic disk in a third step, subsequent to the second step shown in FIG. 13A and FIG. 13B.
Figure 14B:
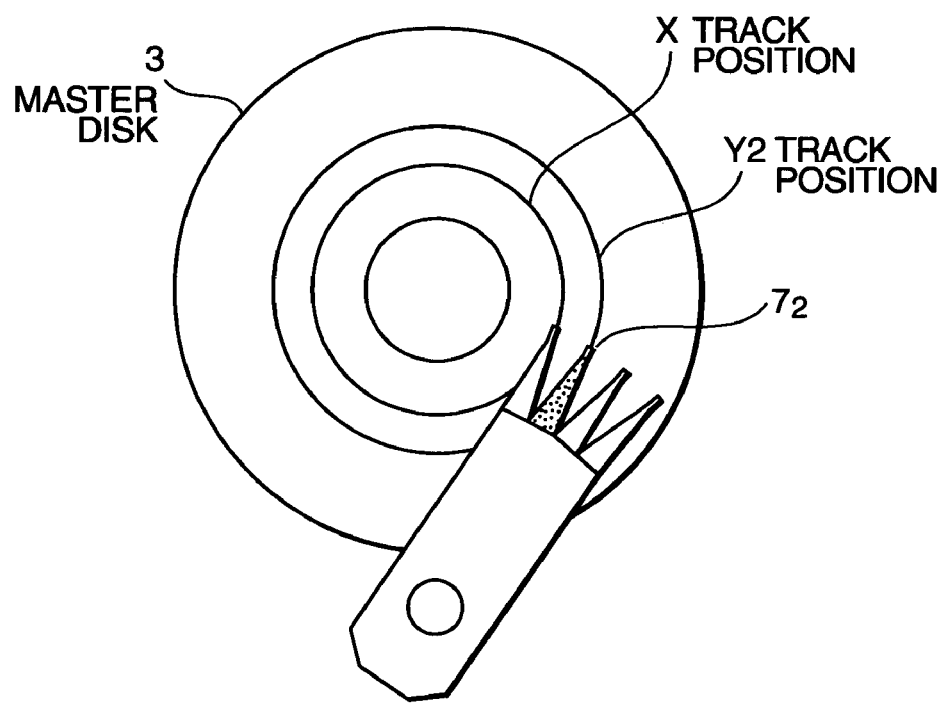
FIG. 14B is an explanatory view showing the state of the master disk in the third step.

Another major difference is that, also on one side of the master disk 3 (bottom side in the figure), there are similarly provided a group of N (four, numbered $7_1$ to $7_4$ in FIG. 12B and other drawings) read-only heads disposed on one side of the master disk 3, approximately in the radial direction of the master disk 3 in a fan-like arrangement at equal intervals. Each of them reads out patterns on the master disk 3.

A further difference is that the servo heads $10_1$ to $10_4$ at each side of each of the magnetic disks 4 and the read-only heads $7_1$ to $7_4$ for the master disk 3 are stacked on just one rotary positioner 11 so as to be integrally held and rotated.

Here, all of the heads denoted by reference numerals with the same subscripts, the servo head $10_1$ on each side of each of the magnetic disks 4 and the read-only head $7_1$ on the master disk 3, for example, are regarded as having been adjusted so that they can gain access to the same radial positions on the sides of their respective disks. In the same way, other heads denoted by reference numerals with the same subscripts (hereinafter generally taken as "i"), the servo heads $10_i$ and the read-only head $7_i$, are also regarded as having been adjusted so that they can gain access to the same radial positions on the sides of their respective disks.

Next, circuits associated with the rotary positioner 11 in FIG. 10B will be explained. A head position and clock detecting unit 8 detects a track address Trk and a position error signal PES for an arbitrary one of the read-only heads $7_1$ to $7_4$ (which will be red-only head $7_2$ in this example). From the track address Trk and the position error signal PES that is detected, a detected head position R is obtained and a signal representing the detected head position R is outputted. In addition to this, the detecting unit 8 has a function that will be described later.

An error signal which represents the difference between the detected head position R of the read-only head $7_2$ and a target head position Rs for the read-only head $7_2$ is inputted to the servo compensator 12. The servo compensator 12 then obtains a servo compensating value so as to make the inputted error signal minimum. The power amplifier 13, on the basis of the servo compensating value, outputs a driving current for the rotary positioner 11 to carry out rotational driving of the rotary positioner 11. This makes the read-only head $7_2$ stably settled on a track corresponding to the target head position Rs to bring the head $7_2$ in a following up state.

In the following up state, the four read-only heads $7_1$ to $7_4$ read out read signals $RD1_1$ to $RD1_4$, respectively, from the clock patterns PC1 and the servo patterns PS1 in the master disk 3. From the read signals $RD1_1$ to $RD1_4$, the head position and clock detecting unit 8 reproduces clocks $CLK_1$, to $CLK_4$ about the read-only head $7_1$ to $7_4$, respectively. The unit 8 further carries out binary processing of the read signals $RD1_1$ to $RD1_4$ in synchronism with the clocks $CLK_1$ to $CLK_4$, respectively. Then, the unit 8 detects items of position information (track addresses Trk, sector addresses Sec, and position error signals PES), similar to what was explained in the first example, about each of the read-only heads $7_1$ to $7_4$.

In the case as shown in FIG. 10B in which only one rotary positioner 11 is provided for making the servo heads $10_1$ to $10_4$ carry out writing of servo information to the magnetic disks 4, an address correction data memory 23 in the attached circuit serves as a memory for storing address correction data (hereinafter referred to as "in-positioner address correction data") obtained by the processing of measuring track position error (hereinafter referred to as "in-positioner head position error"). In the measuring processing, as will be explained later, the in-positioner head position errors are measured as errors between respective track positions of the read-only head $7_i$ and the servo head $10_i$ in each of respective correspondences between the read-only heads $7_1$ to $7_4$ and the servo heads $10_1$ to $10_4$.

The clocks $CLK_1$ to $CLK_4$ and items of position information (track addresses Trk, sector addresses Sec and position error signals PES) about the respective read-only head $7_1$ to $7_4$ are inputted to a servo head address deriving unit 24. Along with this, the servo head address deriving unit 24 refers to in-positioner address correction data in the address correction data memory 23 and then transmits the items of position information (track addresses Trk, sector addresses Sec and position error signals PES) to the respective servo heads $10_1$ to $10_4$ on each side of each of the magnetic disks 4.

Specifically, as items of position information for the servo heads $10_i$, for example, the servo head address deriving unit 24 transmits items of position information (track addresses Trk, sector addresses Sec and position error signals PES) of the read-only head $7_i$ by carrying out correction on track addresses Trk of the items by the corresponding in-positioner address correction data, with sector addresses Sec and position error corrections PES left as they are.

The servo pattern generator 9, on the basis of items of information (the above track addresses Trk, sector addresses Sec and position error signals PES) for each of the servo heads $10_i$ on each side of each of the magnetic disks 4 transmitted from the servo head address deriving unit 24, generates writing patterns for each of the servo heads $10_i$ on each side of each of the magnetic disks 4 in synchronism with the clocks $CLK_i$ from the head position and clock detecting unit 8. Moreover, each of the servo heads $10_i$ is made to write servo patterns PS2 including corresponding clock patterns at its own address position on the magnetic disk 4 corresponding to the servo head $10_i$.

Each of the servo heads $10_1$ to $10_4$ carries out the above writing operation with its own assigned track range. By using one head stack servo unit, the writing is simultaneously carried out with N heads on each side of each of the magnetic disks 4. Therefore the time for carrying out servo writing is shortened to 1/N.

For preventing each of the servo heads $10_1$ to $10_4$ on the same side of a magnetic disk 4 from entering track regions out of the assigned region to carry out writing, the servo head address deriving unit 24 is regarded as further including the following unit. The unit, with each of the servo heads $10_1$ to $10_4$ (generally described as "$10_i$") taken as an object, checks the track address Trk of items of position information (track addresses Trk, sector addresses Sec, and position error signals PES) transmitted to the servo pattern generator 9. The check is carried out about whether or not the track address to be transmitted is within the track range assigned to the corresponding servo head $10_i$. When the track address is out of the assigned track range, the unit inhibits transmission of the items of the position information to thereby prevent the servo head $10_i$ from writing servo information relating to the position information.

With reference next to FIGS. 12A to 14B, an example will now be explained of the procedure for making a plurality of the servo heads $10_1$ to $10_4$, on the same side of a magnetic disk 4, carry out writing correctly in their respective track ranges assigned thereto. In the procedure, position errors (in-positioner head position errors) between the servo heads $10_1$ to $10_4$, and the read-only heads $7_1$ to $7_4$ corresponding to the servo heads $10_1$ to $10_4$ are measured, respectively. The measured errors are then corrected. For convenience, the correction is referred to as "in-positioner address correction".

Step 1. Any one of the read-only heads $7_1$ to $7_4$ (taking the head $7_2$ as an example in this explanation) is selected. Then, with the read-only heads $7_2$ being made to follow up an arbitrary track position X on the master disk 3 (see FIG. 12B), marking signals (for example, constant frequency signals) σ2, σ3 and σ4 are written for one revolution on the side of the magnetic disk 4 (like in FIG. 6A) by the servo heads $10_2$, $10_3$ and $10_4$, respectively (see FIG. 12A).

At this time, the respective track positions of the read-only heads $7_1$ to $7_4$ are read simultaneously.

Step 2. Next, as in FIG. 7A, while a signal read out by the servo head $10_1$ is observed as a read signal RD2, the servo head $10_1$ is moved onto the track of the signal σ2 written by the servo head $10_2$ (see FIG. 13A). Then, reading is carried out to obtain the track position Y1 of the read-only head $7_2$ at this time (see FIG. 13B).

From the difference between the track position Y1 and the original track position X, a track position difference between the servo heads $10_1$ and $10_2$ (taken as DS1) is determined.

The track position difference between the read-only heads $7_1$ and $7_2$ (taken as DR1) is known as the difference between track positions that were read from the master disk 3 by the read-only heads $7_1$ and $7_2$ in the procedure of step 1. Moreover, let the track address read by the selected read-only head $7_2$ (for example) be given to the servo head $10_2$ as its track address for servo information writing to make both of the addresses identical. Thus, the track address given to the servo head $10_1$ is obtained by adding a difference, given by subtracting the track position difference DR1 from the track position difference DS1, as in-positioner address correction data to the track address read by the read-only heads $7_1$ corresponding to the servo head $10_1$.

For example, when the above difference is positive, the correction must be carried out by taking the track position of the servo head $10_1$ as being shifted toward the center of the disk from the track position of the corresponding read-only head $7_1$. Thus, the track position of the servo head $10_1$ is made to have a value which is given by subtracting the above difference from the track position of the read-only heads $7_1$. Therefore, in this case, the value of the in-positioner address correction data is a negative one, with an absolute value given by the above difference.

Step 3. Following this, the track Y1 is erased. Then, the servo head $10_2$ is moved onto the track of the signal σ3 written by the servo head $10_3$ (see FIG. 14A). Then, reading is carried out to obtain the track position Y2 of the read-only head $7_2$ at this time (see FIG. 14B).

From the difference between the track position Y2 and the original track position X, a track position difference between the servo heads $10_2$ and $10_3$ (taken as DS2) is determined.

The track position difference between the read-only heads $7_2$ and $7_3$ (taken as DR2) is known as the difference between track positions having been respectively read from the master disk 3 by the read-only heads $7_2$ and $7_3$ in the procedure of step 1. Thus, the track address given to the servo head $10_3$ is obtained by adding a difference, given by subtracting the track position difference DR2 from the track position difference DS2, as in-positioner address correction data to the track address read by the read-only heads $7_3$.

For example, when the above difference is positive, the correction must be carried out by taking the track position of the servo head $10_3$ as being shifted toward the periphery of the disk from the track position of the corresponding read-only head $7_3$. Thus, the track position of the servo head $10_3$ is made to have a value given by adding the above difference to the track position of the read-only heads $7_3$. That is, the difference (positive value) becomes the in-positioner address correction data.

Step 4. In the same way as above, the track Y2 is erased and then the servo head $10_3$ is moved onto the track of the signal σ4 written by the servo head $10_4$. Then, reading is carried out to obtain the track position of the read-only head $7_2$. From the difference between the track position and the original track position X, a track position difference between the servo heads $10_3$ and $10_4$ (taken as DS3) is determined.

The track position difference between the read-only heads $7_3$ and $7_4$ (taken as DR3) is known as the difference between track positions that were read from the master disk 3 by the read-only heads $7_3$ and $7_4$ in the procedure of step 1. Thus, a track address given to the servo head $10_4$ is obtained by adding the following in-positioner address correction data to the track address read by the read-only heads $7_4$. The in-positioner address correction data is obtained as the sum of the difference given by subtracting the track position difference DR2 from the track position difference DS2 and a difference given by subtracting the track position difference DR3 from the track position difference DS3 (i.e. the difference obtained by subtracting the track position difference between the read-only heads $7_2$ and $7_4$ from the track position difference between the read-only heads $10_2$ and $10_4$).

The procedures of step 1 to step 4 are repeated for the servo heads $10_1$ and $10_4$ on both sides of the magnetic disks 4. In-positioner address correction data obtained in this way are stored in the address correction data memory 23 in FIG. 10.

Then, the servo head address deriving unit 24 in FIG. 10 carries out correction of the track addresses of the items of position information (track addresses Trk, sector addresses Sec and position error signals PES) from the head position and clock detecting unit 8. The items of position information from the unit 8 are those read by the respective read-only heads $7_1$ to $7_4$. The correction is carried out by adding in-positioner address correction data in the address correction data memory 23 to the respective track addresses as explained above in the above step 2 to step 4. Thus, the unit 24 obtains items of position information (track addresses Trk, sector addresses Sec and position error signals PES) of the servo heads $10_1$ to $10_4$ corresponding to the read-only heads $7_1$ to $7_4$, respectively, and transmits the obtained items of position information to the servo pattern generator 9.

FOURTH EXAMPLE

Figure 11A:
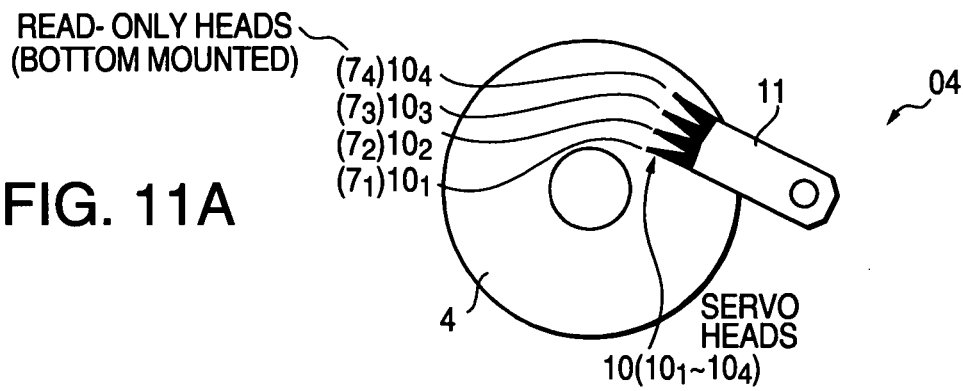
FIGS. 11A and 11B are views showing a schematic arrangement of a magnetic data embedding system as a fourth example according to the invention.
Figure 11B:
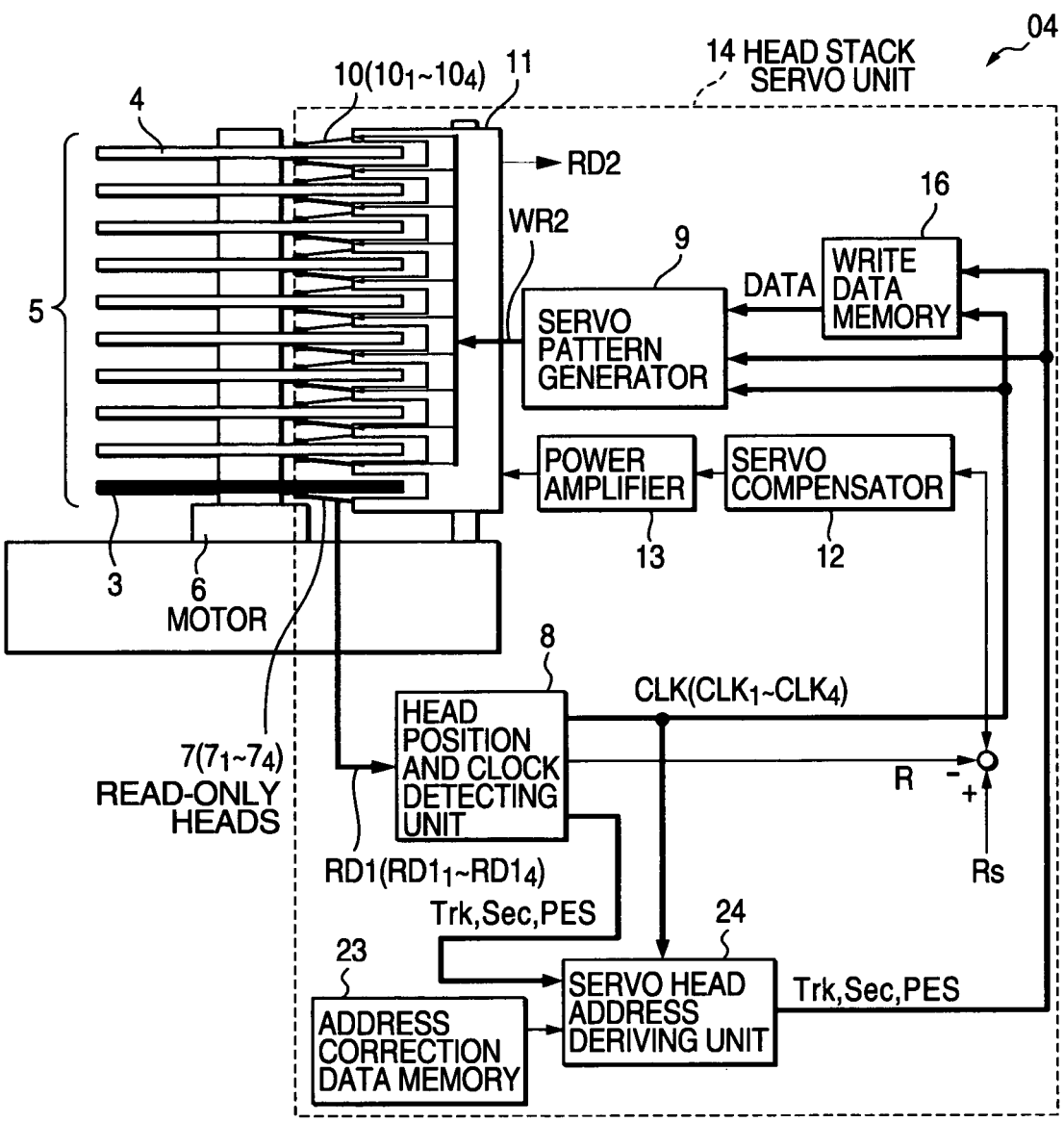

FIGS. 11A and 11B show a magnetic data embedding system (disk servo writer) 04 as a fourth example of the invention.

The difference between the system in the fourth example and the system in the third example shown in FIGS. 10A and 10B is only that a write data memory 16 like that shown in FIG. 8B is additionally provided to an inputting section of the servo pattern generator 9 in the system in the fourth example. The write memory 16 is a memory that stores data to be written in data region DTA in the magnetic disk 4 when such data are presented. Thus, to the write data memory 16, there are inputted items of position information (track addresses Trk, sector addresses Sec and position error signals PES) transmitted from the servo head address deriving unit 24, each for each of the servo heads $10_i$ on each side of each of the magnetic disks 4, and clocks $CLK_i$ from the head position and clock detecting unit 8. Furthermore, in synchronism with clocks $CLK_i$, the write data memory 16 outputs respective data Data each to be written to a data region DTA with an address of a servo pattern PS2 to which each of the servo heads $10_i$ carries out writing separately from the others.

This makes each servo head $10_i$, subsequent to writing of servo patterns PS2 to the corresponding magnetic disk 4, carry out writing of the data Data in the data region with the same address.

A procedure of measurement and correction (in-positioner address correction) of a position error between a servo head and a read-only head in this case is the same as that in the third example.

Although not shown in the drawings, it is also possible to dispose a plurality of rotary positioners like the rotary positioners 11 shown in FIGS. 10A and 10B and FIG. 11A and 11B (third and fourth examples) on the periphery of the magnetic disks 4, as in FIGS. 1A and 1B, so that the servo heads $10_1$ to $10_4$ (in a fan-like shape on each of a plurality of the rotary positioners) carry out writing of servo information in parallel, with track ranges separately assigned to the heads $10_1$ to $10_4$.

In the following, an example will be explained of a procedure in this case for obtaining track differences presented among servo heads (for convenience, the will be referred to as "inter-positioner head position errors") separately provided on a plurality of the rotary positioners and carrying out correction of the differences (for convenience, they will be referred to as "inter-positioner address correction").

First, on each side of each of the magnetic disk 4, one servo head is selected as being specified from a group of the servo heads $10_1$ to $10_4$ (in a fan-like shape on each one of a pair of rotary positioners) taken here as A and B). A servo head selected from the A side rotary positioner is designated as $10_A$ and a servo head selected from the B side rotary positioner is designated as $10_B$.

In the same way, a read-only head on the master disk 3, selected for carrying out positioning control (track following up) of the A side rotary positioner, is designated as $7_A$, and a read-only head selected for carrying out positioning control (track following up) of the B side rotary positioner is designated as $7_B$.

In general, the respective positions of the heads $10_A$, $10_B$, $7_A$ and $7_B$ can be arbitrarily determined. However, for easy understanding and easiness in carrying out track position correcting calculation, let the heads $10_A$ and $7_A$ on the A side rotary positioner be at approximately the same radial positions on the disk 4 and 3 as objects of access, respectively. In the same way, let the heads $10_B$ and $7_B$ on the B side rotary positioner be also at approximately the same radial positions on the disk 4 and 3 as objects of access, respectively.

Then, with the read-only heads $7_A$ and $7_B$ likened to the heads 7A and 7B in FIG. 1B and the servo heads $10_A$ and $10_B$ likened to the heads 10A and 10B in FIG. 1B, respectively, in the same way as that explained for FIGS. 6A and 6B and FIGS. 7A and 7B, a position error (track correction value) $\Delta\tau$ between the servo head $10_A$ on the A side rotary positioner and the servo head $10_B$ on the B side rotary positioner is obtained as an inter-positioner head position error.

The position error (track correction value) $\Delta\tau$ between the servo heads on a pair of the rotary positioners as an inter-positioner head position error is obtained for every side of the magnetic disks 4. Every obtained position error (track correction value) $\Delta\tau$ is stored as inter-positioner address correction data in the address correction data memory 23 for at least one of a pair of the rotary positioners (on A side in the example) separately from the in-positioner address correction data.

As a specific procedure for address correction in the example, in the A side rotary positioner, the servo head address deriving unit 24 carries out correction by adding in-positioner address correction data and inter-positioner address correction data to obtain items of position information to be transmitted to the servo pattern generator 9.

In this example, in the A side rotary positioner, to the in-positioner address correction data (each being added to a track address of items of position information read by the read-only head $7_i$ for obtaining items of position information to be given to the servo head $10_i$) as explained with reference to FIGS. 12A to 14B, equal track correction values $\Delta\tau$ are added as the inter-positioner address correction data (the inter-positioner head position error). In the B side rotary positioner, when no other rotary positioners are presented, correction is to be carried out only with the in-positioner address correction data.

When track position differences between adjacent twos of a plurality of the servo heads in a group and track position differences between adjacent twos of a plurality of the read-only heads in a group have been already measured in each of a pair of the rotary positioners, the inter-positioner address correction data can be generally obtained as follows.

Namely, with the read-only head $7_B$, an object to be followed up by the B side rotary positioner as one of a pair of the rotary positioners, being made to follow up a specified track, an arbitrarily specified one of a plurality of servo heads including the servo head $10_B$, on the same side of the magnetic disk in the B side rotary positioner, is made to write a specified signal line on the side.

Subsequent to this, by changing a track to be followed up by the read-only head $7_A$, an object to be followed up by the A side rotary positioner as another one of a pair of the rotary positioners, an arbitrarily specified one of a plurality of servo heads including the servo head $10_A$, on the same side of the magnetic disk in the A side rotary positioner, is made to position on the specified above signal line.

Then, from the track difference between an arbitrarily specified one of a plurality of read-only heads including the read-only head $7_B$, provided on the B side rotary positioner, and an arbitrarily specified one of a plurality of read-only heads including the read-only head $7_A$, provided on the A side rotary positioner, inter-positioner address equivalent to the above track correction value $\Delta\tau$ is obtained.

FIFTH EXAMPLE

Figure 15A:
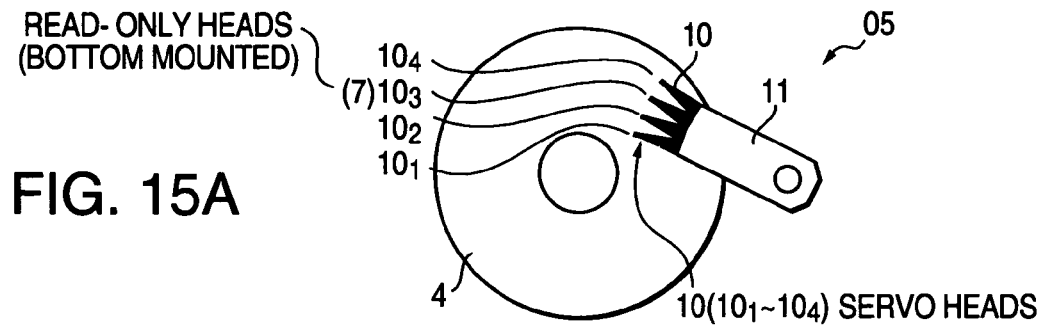
FIGS. 15A–15C are views showing a schematic arrangement of a magnetic data embedding system as a fifth example according to the invention.
Figure 15B:
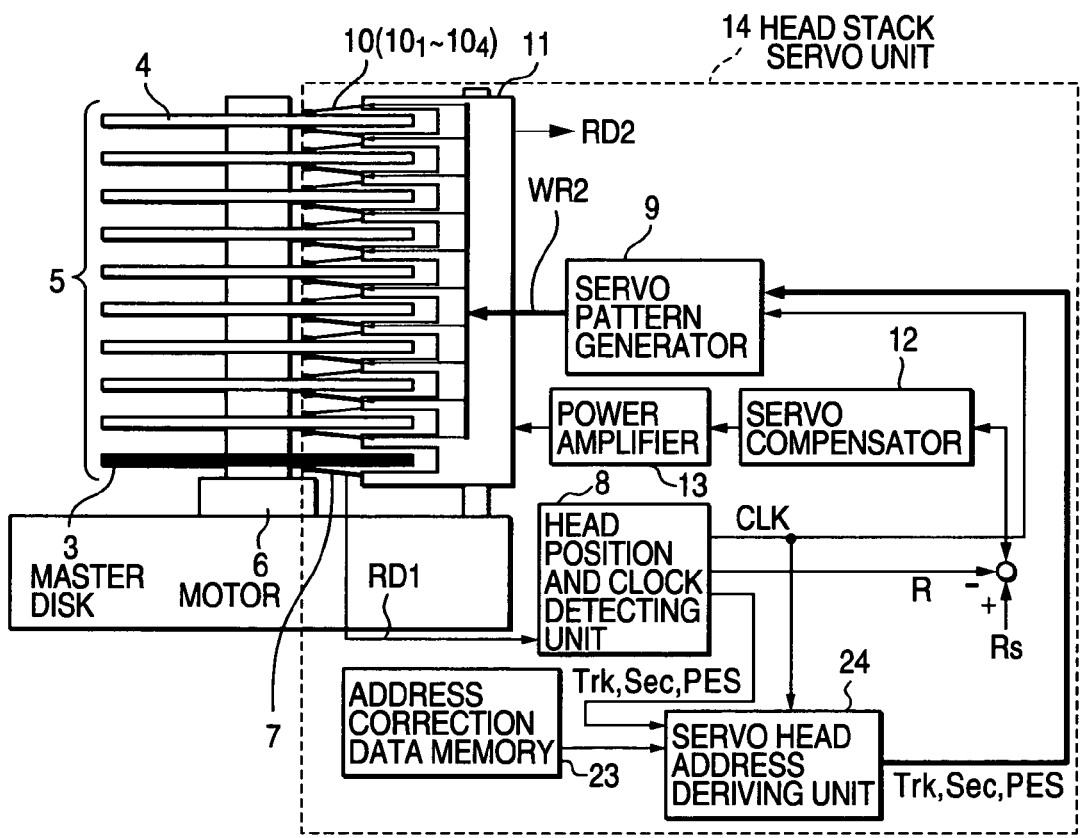
Figure 15C:
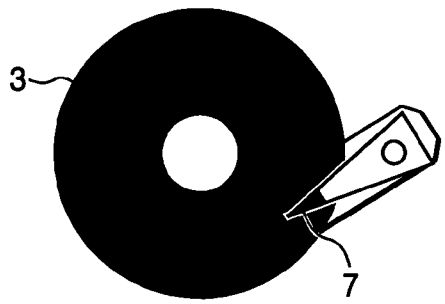
Figure 16A:
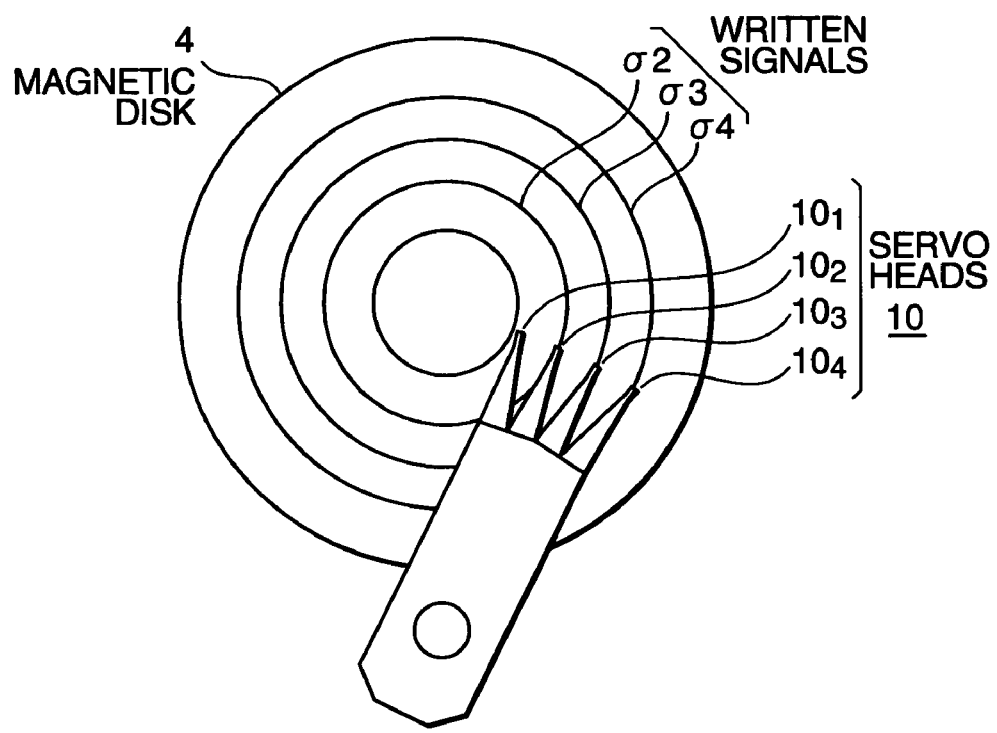
FIG. 16A is an explanatory view showing the state of a magnetic disk in a first step of a procedure for detecting an in-positioner head position error in the magnetic data embedding system in the fifth example, shown in FIG. 15.
Figure 16B:
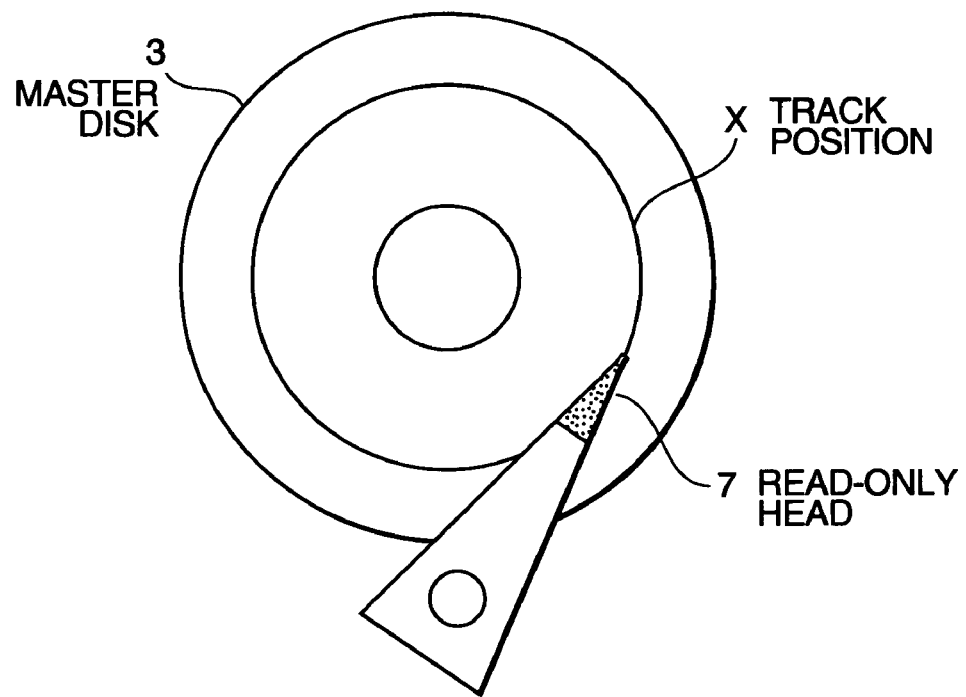
FIG. 16B is an explanatory view showing a state of a master disk in the first step.
Figure 17A:
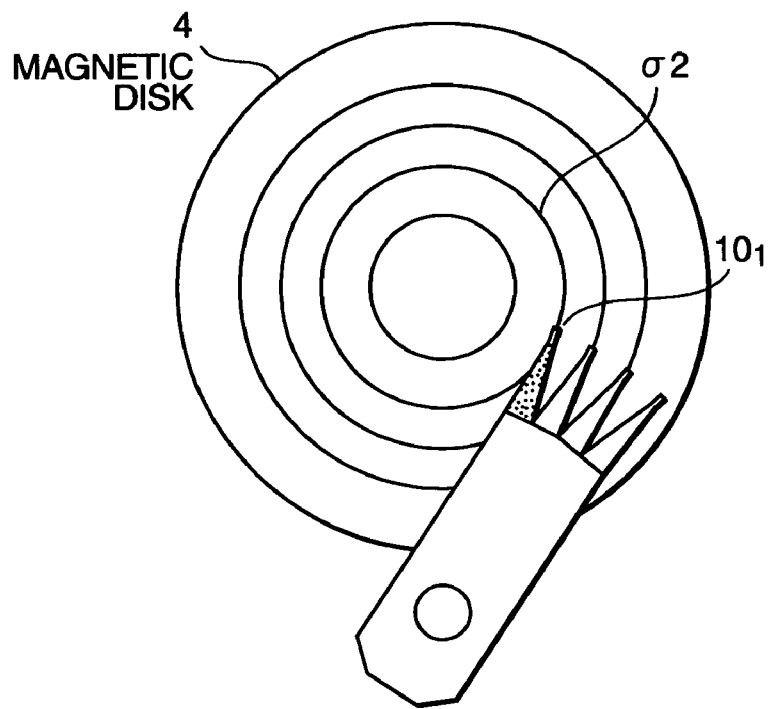
FIG. 17A is an explanatory view showing the state of the magnetic disk in the second step, subsequent to the first step shown in FIG. 16A and FIG. 16B.
Figure 17B:
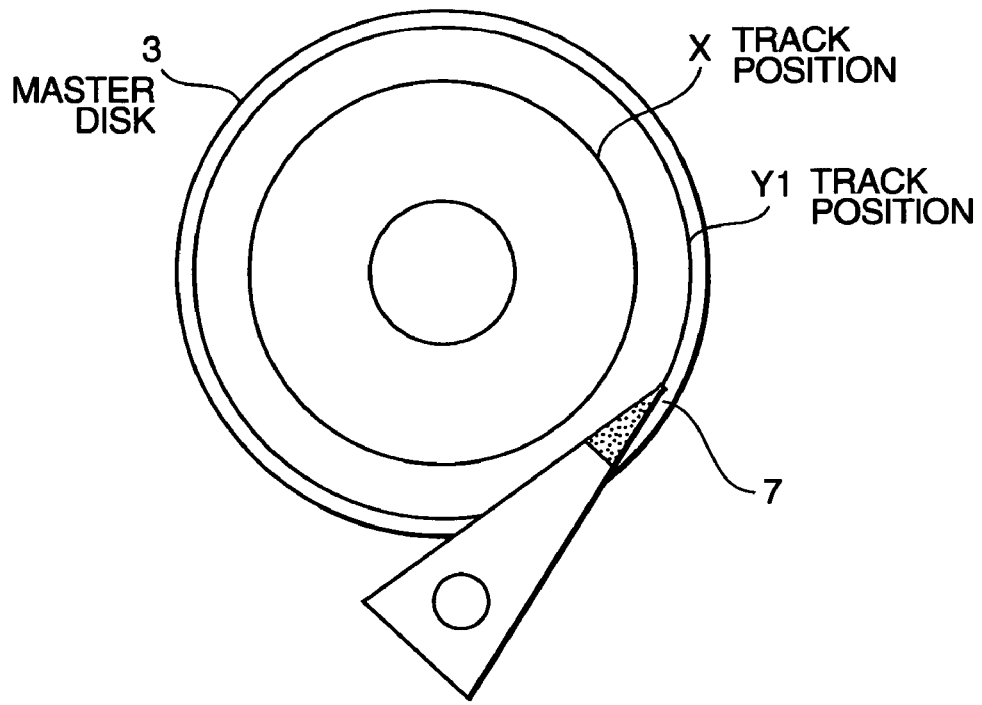
FIG. 17B is an explanatory view showing the state of the master disk in the second step.
Figure 18A:
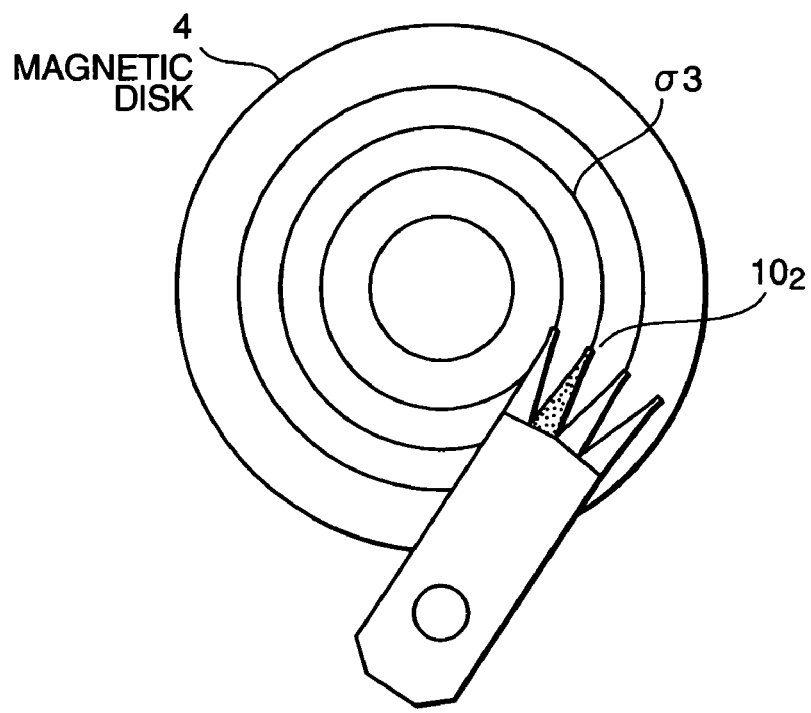
FIG. 18A is an explanatory view showing the state of the magnetic disk in a third step, subsequent to the second step shown in FIG. 17A and FIG. 17B.
Figure 18B:
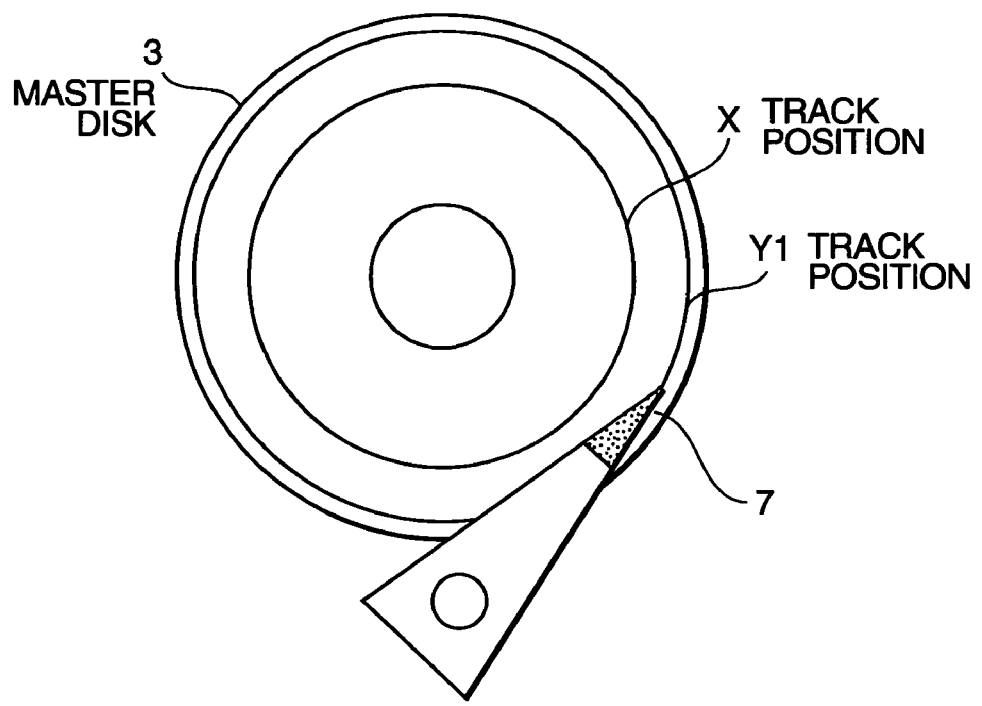
FIG. 18B is an explanatory view showing the state of the master disk in the third step.
Figure 19A:
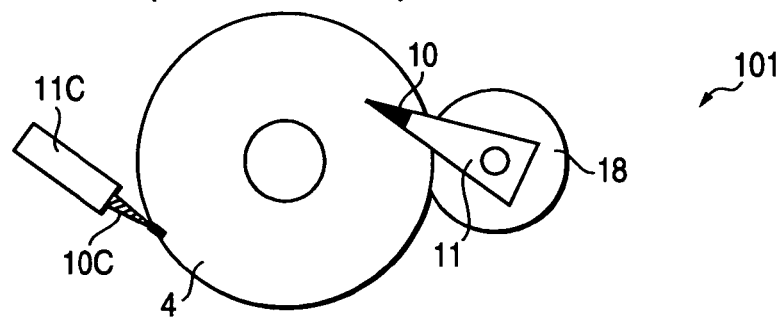
FIGS. 19A and 19B are views showing a schematic arrangement of an example of a related magnetic data embedding system.
Figure 19B:
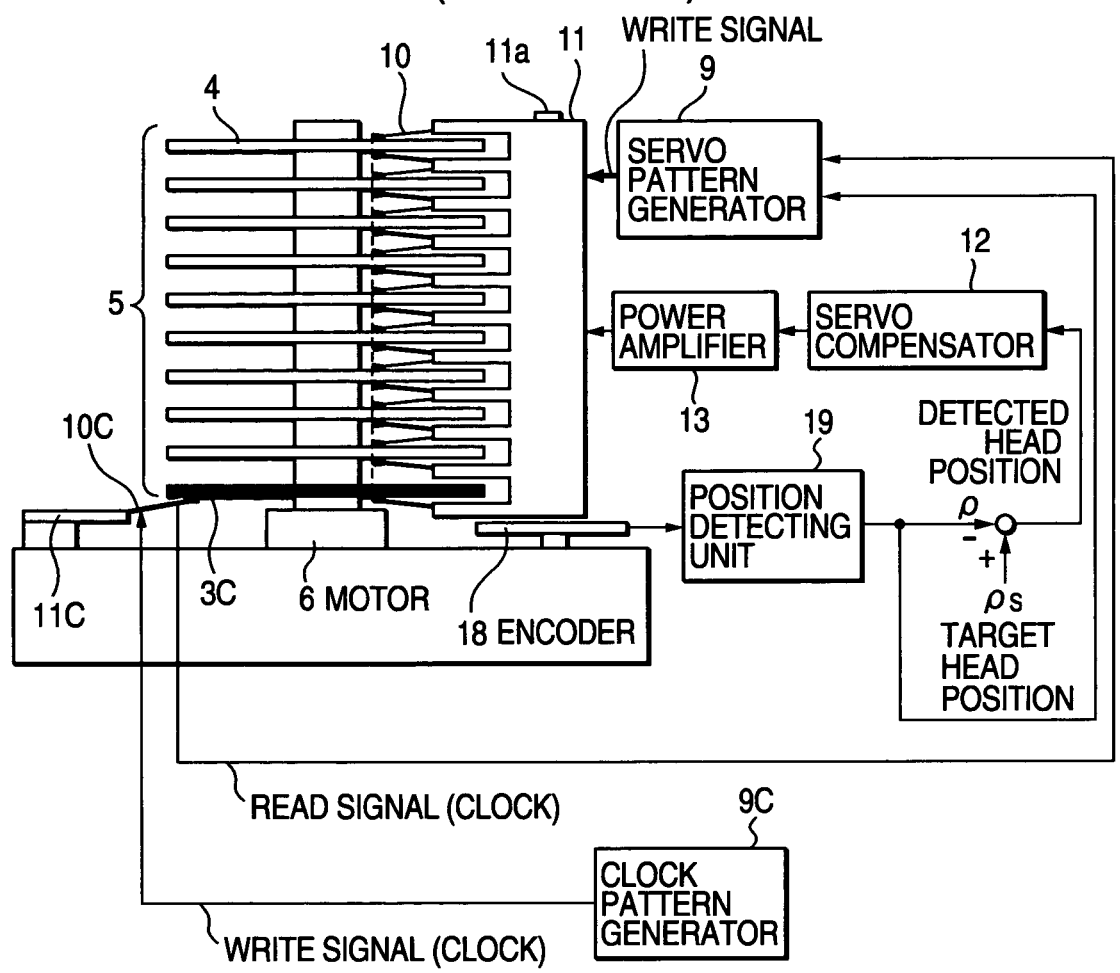
Figure 20:
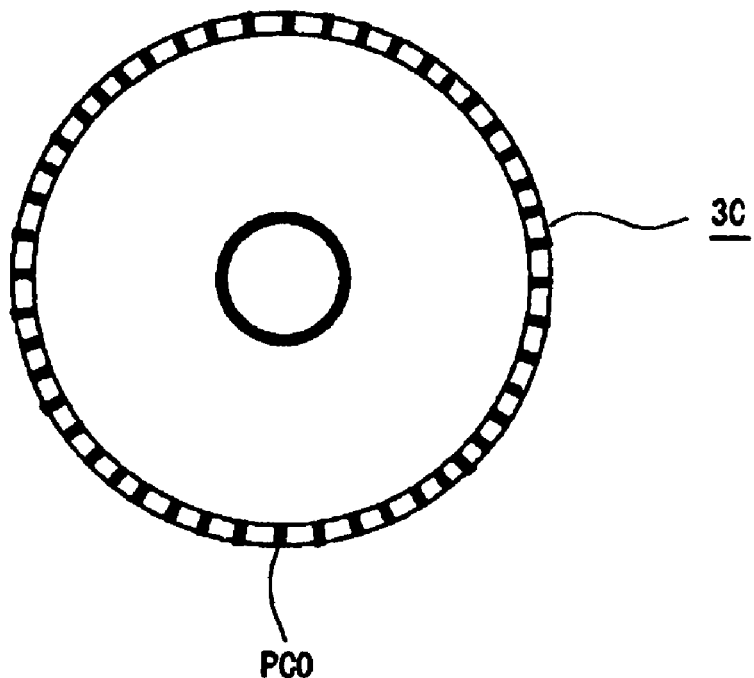
FIG. 20 is a plan view showing a schematic arrangement of a clock pattern disk used in the related magnetic data embedding system shown in FIG. 19.
Figure 21:
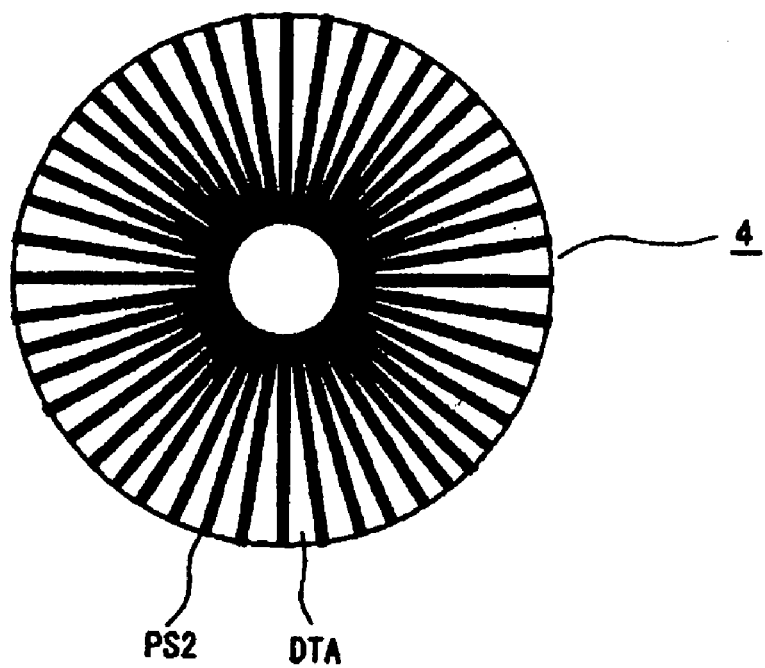
FIG. 21 is a plan view showing a schematic arrangement of the magnetic disk.

FIGS. 15A and 15B show a magnetic data embedding system (disk servo writer) 05 as a fifth example of the invention.

The difference between the system in the fifth example and the system in the third example shown in FIGS. 10A and 10B is that the number of the read-only head for reading one side (the bottom side in the figure) of the master disk 3 is made to be one, a read-only head 7, in the system in the fifth example.

All of the servo heads $10_i$ denoted with the same subscript, each being one of servo heads $10_1$ to $10_4$ on each face of each of the magnetic disks 4, are regarded as having been adjusted so that they can gain access to the same radial positions on the sides of the disks 4 corresponding to the respective heads. Moreover, the read-only head 7 is regarded as having been adjusted so that it can gain access on the side of the disk 3 to a radial position the same as the radial position to which an arbitrary one of the servo heads $10_1$ to $10_4$, the servo head $10_4$ in this example, gains access on each side of the each of the disks 4.

In FIG. 15B, the head position and clock detecting unit 8 detects a track address Trk and a position error signal PES about the single read-only head 7. From the track address Trk and the position error signal PES that is detected, the unit 8 obtains a detected head position R and outputs a signal representing the detected head position R to stably settle the read-only head 7 on a track corresponding to the target head position Rs, which brings the head 7 in a following up state.

In the following up state, the read-only head 7 reads out a read signal RD1 from the clock patterns PC1 and the servo patterns PS1 in the master disk 3. From the read signal RD1 that is read out, the head position and clock detecting unit 8 reproduces a clock CLK from the read-only head 7. The unit 8 further carries out binary processing of the read signal RD1 in synchronism with the clock CLK. Then, the unit 8 detects items of position information (track addresses Trk, sector addresses Sec and position error signals PES) for the read-only head 7.

In the case as shown in FIGS. 15A and 15B, in which only one rotary positioner 11 is provided for making the servo heads $10_1$ to $10_4$ carry out writing of servo information to the magnetic disks 4, an address correction data memory 23 in the attached circuit is a memory for storing address correction data (in-positioner address correction data) obtained by the processing of measuring track position error (in-positioner head position error). In the measuring processing, as will be explained later, the in-positioner head position error is measured as an error between the track position to the read-only head 7 and that to each of the servo heads $10_1$ to $10_4$ made to be in a correspondence with the read-only head 7.

However, the servo heads $10_1$ to $10_4$ include some heads with radial positions on the disk entirely differed from that of the read-only heads 7. Therefore, in-positioner head position errors in the fifth example include those with large values compared with those in the third and fourth example.

To a servo head address deriving unit 24, there is inputted the clock CLK and items of position information (track addresses Trk, sector addresses Sec and position error signals PES) for the read-only head 7. Along with this, the servo head address deriving unit 24 checks in-positioner address correction data in the address correction data memory 23 and then transmits the items of position information (track addresses Trk, sector addresses Sec and position error signals PES) to the servo heads $10_1$ to $10_4$ on each side of each of the magnetic disks 4.

Specifically, as items of position information for the servo heads $10_i$, for example, the servo head address deriving unit 24 transmits items of position information (track addresses Trk, sector addresses Sec and position error signals PES) of the read-only head 7 by carrying out correction on track addresses Trk of the items by the corresponding in-positioner address correction data, with sector addresses Sec and position error corrections PES left as they are.

The servo pattern generator 9, on the basis of items of information (the above track addresses Trk, sector addresses Sec and position error signals PES) for each of the servo heads $10_i$ on each side of each of the magnetic disks 4 transmitted from the servo head address deriving unit 24, generates writing patterns for each of the servo heads $10_i$ on each side of each of the magnetic disks 4 in synchronism with the clock CLK from the head position and clock detecting unit 8. Moreover, each of the servo heads $10_i$ is made to write servo patterns PS2 including corresponding clock pattern on its own address position on the magnetic disk 4 corresponding to the servo head $10_i$.

Each of the servo heads $10_1$ to $10_4$ carries out the above writing operation within its own assigned track range. Thus, with one head stack servo unit, writing is simultaneously carried out with N heads on each side of each of the magnetic disks 4. Therefore, the time for carrying out servo writing is shortened to 1/N.

Also in the fifth example, for preventing any of the servo heads $10_1$ to $10_4$ on the same side of the magnetic disk 4 from entering track regions out of the assigned region to carry out writing there, the servo head address deriving unit 24 is regarded as further including the following unit. The unit, with each of the servo heads $10_1$ to $10_4$ (generally described as "$10_i$") taken as an object, checks track address Trk of items of position information (track addresses Trk, sector addresses Sec and position error signals PES) transmitted to the servo pattern generator 9. The check that is carried out determines whether or not the track address to be transmitted is within the track range assigned to the corresponding servo head $10_i$. If the track address is out of the assigned track range, the unit inhibits transmission of the items of the position information to thereby prevent the servo head $10_i$ from writing servo information relating to the position information.

In the following, by using FIGS. 16A to 18B, an example will be explained of the procedure for carrying out measurement of a position error (the in-positioner head position error) between each of the servo heads $10_1$ to $10_4$ on the same side of a magnetic disk 4 (taken as arbitrary objects of measurement and arranged in a fan-like shape) and the read-only heads 7 corresponding to each of the servo heads $10_i$, and correction (in-positioner address correction) of the measured in-positioner head position error.

Step 1. With the read-only heads 7 being made to follow up an arbitrary track position X on the master disk 3 (see FIG. 16B), marking signals (for example, constant frequency signals) σ2, σ3 and σ4 are written during one revolution on the side of the magnetic disk 4 as in FIG. 6A by the servo heads $10_2$, $10_3$ and $10_4$, respectively (see FIG. 16A).

Step 2. Next, the servo head $10_1$ is moved onto the track of the signal σ2 written by the servo head $10_2$ (see FIG. 17A). Then, reading is carried out to obtain the track position Y1 of the read-only head 7 at this time (see FIG. 17B). From the difference between the track position Y1 and the original track position X, a track position difference between the servo heads $10_1$ and $10_2$ (taken as DS1) is determined.

Step 3. Following this, the track Y1 is erased. Then, the servo head $10_2$ is moved onto the track of the signal σ3 written by the servo head $10_3$ (see FIG. 18A). Then, reading is carried out to obtain the track position Y2 of the read-only head 7 at this time (see FIG. 18B).

From the difference between the track position Y2 and the original track position X, a track position difference between the servo heads $10_2$ and $10_3$ (taken as DS2) is determined.

Step 4. In the same way as above, the track Y2 is erased and then the servo head $10_3$ is moved onto the track of the signal σ4 written by the servo head $10_4$. Then, reading is carried out to obtain the track position of the read-only head 7 at this time. From the difference between the track position and the original track position X, a track position difference between the servo heads $10_3$ and $10_4$ (taken as DS3) is determined.

Here, let a track address read by the selected read-only head 7 be given to the servo head $10_4$, for example, as its track address for servo information writing to make both of the addresses identical. Then, by the above measurement, a track address given to the servo head $10_1$ is obtained by adding a negative value with the absolute value of the sum of three track position differences (DS1), (DS2) and (DS3) as in-positioner address correction data to the track address read by the read-only heads 7 (specifically, a correction by subtracting the above sum from the track address).

The correction is carried out by taking the track position of the servo head $10_1$ as being shifted toward the center of the disk from the track position of the corresponding read-only head 7 by the sum of the above three track position differences.

In the same way, a track address given to the servo head $10_2$ is obtained by adding a negative value, with the absolute value of the sum of two track position differences (DS2) and (DS3), as in-positioner address correction data to the track address read by the read-only heads 7.

Namely, the correction is carried out by taking the track position of the servo head $10_2$ as being shifted toward the center of the disk from the track position of the corresponding read-only head 7 by the sum of the above two track position differences.

In the same way, a track address given to the servo head $10_3$ is obtained by adding a negative value, with an absolute value of the track position difference (DS3), as in-positioner address correction data to the track address read by the read-only heads 7.

Namely, the correction is carried out by taking the track position of the servo head $10_3$ as being shifted toward the center of the disk from the track position of the corresponding read-only head 7 by the above track position difference.

The procedures of step 1 to step 4 are repeated for the servo heads $10_1$ and $10_4$ on both sides of the magnetic disks 4. The thus-obtained in-positioner address correction data are stored in the address correction data memory 23 in FIG. 15B.

The servo head address deriving unit 24 in FIG. 15B carries out correction to the track address of the items of position information (track addresses Trk, sector addresses Sec and position error signals PES) from the head position and clock detecting unit 8. The items of position information from the unit 8 are those read by the read-only head 7. The correction is carried out by adding corresponding in-positioner address correction data in the address correction data memory 23 to the above respective track addresses as explained above. Thus, the unit 24 obtains items of position information (track addresses Trk, sector addresses Sec and position error signals PES) for the servo heads $10_1$ to $10_4$, and transmits the obtained items of position information to the servo pattern generator 9.

It is also possible to dispose a plurality of rotary positioners, each being like the rotary positioner 11 shown in FIGS. 15A and 15B, on the periphery of the magnetic disks 4 as in FIGS. 1A and 1B so that the servo heads $10_1$ to $10_4$ in a fan-like shape on each of a plurality of the rotary positioners carry out writing of servo information in parallel, with track ranges separately assigned to the heads $10_1$ to $10_4$.

In this case, as a procedure of obtaining track differences presented among corresponding servo heads on a plurality of the rotary positioners (inter-positioner head position errors) and carrying out correction of the differences (inter-positioner address correction), the procedure explained in the fourth example can be similarly applied in a form in which the number of the read-only heads on each rotary positioner is limited to one as the read-only head 7.

According to the invention, in a magnetic data embedding system, in which a master disk and a plurality of magnetic disks as objects for writing (magnetic disks served for writing) are stacked on a shaft of a spindle motor, and items of servo information read out from the master disk or items of modified servo information prepared on the basis of the read out servo information, or these items of the servo information and data to be written in a data region are written to a plurality of the magnetic disks served for writing in parallel, one rotary positioner or a plurality positioners are disposed around the stacked magnetic disks. Each of the rotary positioners has one or a group of a plurality of read-only heads with the specified number for reading the master disk and one or a group of a plurality of servo heads with the specified number provided for each side of a plurality of magnetic disks served for writing to write the servo information onto the side of the disk. The read-only heads and the servo heads are held in a stack and integrally turned by the rotary positioner. The rotary positioners are disposed so that at least a plurality of servo heads are presented on the same side of each of the magnetic disks served for writing for gaining access thereto. This makes a plurality of the servo heads carry out writing on the same side of the magnetic disk served for writing in parallel with one another with their respective track ranges assigned thereto (according to the first, second, eighth, ninth, tenth, eleventh and twelfth aspects of the invention) to thereby make it possible to shorten the writing time of servo information to the magnetic disk served for writing.

Furthermore, the system is arranged so that writing is carried out with corrections about position errors (inter-positioner head position errors) in the radial direction of the magnetic disk, which errors are presented among the servo heads provided on respective rotary positioners and positioned on the same side of the magnetic disk served for writing (the second, fifth, sixth, twelfth, fourteenth and fifteenth aspects of the invention). Moreover, the system is arranged so that writing is carried out with corrections about position errors (in-positioner head position errors) in the radial direction of the magnetic disk, which errors are presented among the read-only head and each of a plurality of the servo heads, provided on the same rotary positioner and positioned on the same side of the magnetic disk served for writing (the second, fifth and seventh aspects of the invention). Hence, the servo heads can correctly carry out writing of the servo information even at a boundary between their respective track ranges, writing to which are separately assigned to the servo heads, while keeping a correct track space.

Furthermore, the servo heads are so provided as to be allowed to carry out writing only when the servo heads is in their respective track ranges assigned thereto (the third and thirteenth aspects of the invention). This can prevent each of the servo heads from entering track regions out of the assigned track region to carry out writing there. Thus, it is possible to provide for safe and sure reduction in a writing time of data to be embedded in a high density and high accuracy magnetic disk and accordingly in a manufacturing cost thereof.

This application claims the benefit of priority of Japanese applications 2003-016897 and 2003-055264, filed on Jan. 27, 2003 and Mar. 3, 2003, respectively, and the disclosures of these Japanese applications are incorporated herein by reference.

While the invention has been particularly shown and described with reference to preferred embodiment thereof, it will be understood by those skilled in the art that the foregoing and other changes in form and details can be made therein without departing from the spirit and scope of the invention.

What is claimed is:

1. A magnetic data embedding system, comprising:
a spindle motor having a shaft;
a master disk mounted on a shaft of the spindle motor, the master disk having magnetic data written on at least one side thereof;
a plurality of magnetic disks for receiving magnetic writing, the magnetic disks being integrally mounted in a stack on the shaft of the spindle motor, each magnetic disk having a top side and a bottom side;
at least one reading head for reading the magnetic data on the master disk;
a plurality of writing heads that are arranged in writing head groups, each writing head group including at least one of the writing heads, the writing head groups being associated with the top and bottom sides of the magnetic disks such that each writing head group has access to a respective one of the sides; and at least one rotary positioner each integrally holding at least one reading head and at least some the groups of writing heads in a pivotable stack, the at least one rotary positioner being disposed adjacent the periphery of the stack of magnetic disks so that at least a plurality of the writing head groups can gain access to the same side of each of the magnetic disks for writing, wherein the writing head groups on the same side of the magnetic disks carry out writing onto said same side in parallel with other writing head groups on said same side of the magnetic disks within respective assigned track ranges, the writing being carried out in response to the magnetic data read out by at least one reading head and modified magnetic data prepared on the basis of the magnetic data.

2. The magnetic data embedding system as claimed in claim 1, further comprising a unit which monitors the track addresses of the magnetic data written onto the magnetic disks, and inhibits writing of the if a monitored track address is found to be out of an assigned track range.

3. The magnetic data embedding system as claimed in claim 1, further comprising a unit which is provided for the rotary positioner for storing data to be written in data regions of the magnetic disks, provides data to the writing heads, and makes the writing heads carry out writing of the data to the data regions with the addresses.

4. The magnetic data embedding system as claimed in claim 1, wherein:

the at least one rotary positioner and at least one reading head comprise a plurality of rotary positioners and a plurality of reading heads, each of which is carried by a respective one of the rotary positioners, each writing head group has a single writing head, the reading head and each of the writing heads carried by the same rotary positioner are in correspondence, and the reading head and each of the writing heads are so provided as to position on approximately the same radial positions of the master disk and the magnetic disks.

5. The magnetic data embedding system as claimed in claim 1, wherein:

the at least one rotary positioner and the at least one reading head comprise a plurality of rotary positioners and a plurality of reading heads, each of which is carried by a respective one of the rotary positioners, and on the same rotary positioner, one of the reading heads is provided adjacent the master disk and each writing head group has a plurality of writing heads, which are disposed at approximately equal intervals in the radial direction of the magnetic disks.

6. The magnetic data embedding system as claimed in claim 1, wherein the master disk is produced by carrying out writing thereto with any of the heads, with the master disk being stacked.

7. The magnetic data embedding system as claimed in claim 1, wherein the master disk is produced by writing of magnetic information by magnetic printing.

8. A magnetic data embedding system, comprising:

a spindle motor having a shaft with an axis;

a master disk integrally mounted on a shaft of the spindle motor, the master disk having magnetic data including servo information written on at least one side thereof;

a plurality of magnetic disks for writing receiving magnetic writing, the magnetic disks being integrally mounted in a stack on the shaft of the spindle motor, each magnetic disk having a top side and a bottom side;

at least one reading head for reading the magnetic data on the master disk;

a plurality of writing heads that are arranged in writing head groups, each writing head group including at least one of the writing heads, the writing head groups being associated with the top and bottom sides of the magnetic disks such that each writing head group has access to a respective one of the sides;

at least one rotary positioner integrally holding the at least one reading head and the groups of writing heads in a pivotable stack, the at least one rotary positioner being turntable so that each of the reading heads and at least one of the writing heads are positioned on a common plane that substantially includes the axis of the shaft of the spindle motor, and being disposed adjacent the periphery of the stacked magnetic disks so that at least a plurality of the writing heads are presented to gain access to the same side of each of the magnetic disks;

a head position control unit provided for each of the at least one rotary positioners, the unit carrying out comparison of a target head position and a detected head position to turn the rotary positioner so that the difference between the target head position and the detected head position becomes a minimum and bringing the detected head position to be stably settled at the target head position, the target head position being externally given as a radial position on the master disk to be followed up by a specified reading head of the at least one reading head on the rotary positioner, and the detected head position being taken as a radial position of the reading head on the master disk, the radial position being obtained from the magnetic data read out by the reading head as an object to be followed up; and an address correcting unit carrying out correction of at least a track address of items of address information in one of the magnetic data read out by the at least one reading head on the master disk, and modified magnetic data prepared on the basis of the magnetic data, and producing finally written magnetic data one of corrected magnetic data and corrected modified magnetic data for a writing head corresponding to the reading head, the finally written magnetic data including at least a track address of the items of the address information corrected by a specified amount with reference to address correction data measured beforehand, wherein each of the writing heads carries out writing of the finally written magnetic data, each being produced for the writing head itself, onto the side of the magnetic disk receiving the writing, corresponding to the writing head, in parallel with other writing side heads on the same side of the magnetic disks, with its own track range for writing being assigned.

9. The magnetic data embedding system as claimed in claim 8, further comprising a unit which monitors the track address of the finally written magnetic data, and which inhibits writing of the finally written magnetic data if a monitored track address is found to be out of a track range assigned to the writing head beforehand.

10. The magnetic data embedding system as claimed in claim 8, further comprising a unit which is provided for each rotary positioner for storing data to be written in data regions of the magnetic disks, provides data to the writing heads, and makes the writing heads carry out writing of the data to the data regions with the addresses.

11. The magnetic data embedding system as claimed in claim 8, wherein the address correcting unit comprises:
a first track difference correcting unit carrying out correction of track differences presented between track positions of magnetic heads, separately provided on any two of a plurality of the rotary positioners, on at least one side of the two rotary positioners; and
a second track difference correcting unit carrying out, on each of the rotary positioner sides, correction of track difference presented in each of the same rotary positioner between a track position of the at least one reading side head and each of track positions of a plurality of the writing side heads on each side of the magnetic disks served for writing, each of the writing side heads being in the above correspondence with each of the respective reading side heads.

12. The magnetic data embedding system as claimed in claim 11, wherein the address correction data to which the first track difference correcting unit refers are data obtained by:
in each pair of the rotary positioners of a plurality of the rotary positioners and on each side of the magnetic disk served for writing, making a specified writing side head, positioned on the side of the magnetic disk served for writing and provided on one side of a pair of the rotary positioners (hereinafter referred to as a "first rotary positioner"), write a specified line, with the reading side head as the object to be followed up on the first rotary positioner being made to follow up a specified track;
then, while changing a track to be followed up by the reading side head, as the object to be followed up, on the other one of the pair of the rotary positioners (hereinafter referred to as a "second rotary positioner"), making a specified writing side head, provided on the second rotary positioner side and positioned on the magnetic disks served for writing, position at the specified line; and
using at least a track difference at this time between the track position of the specified one of the reading side head on the first rotary positioner side and the track position of the specified one of the reading side head on the second rotary positioner side.

13. The magnetic data embedding system as claimed in claim 11, wherein the address correction data to which the second track difference correcting unit refers are data obtained by:
making one of a pair of the writing side heads (hereinafter referred to as a "first writing side head") of a plurality of the writing side heads, selected at least an object of the measurement on the side of the magnetic disk served for writing, write a specified line in each of the rotary positioners and on each side of the magnetic disk served for writing, with the reading side head as the object to be followed up being made to follow up a specified track (hereinafter referred to as a "first track") on the same rotary positioner;
then, while changing a track to be followed up by the reading side head as the object to be followed up, making the other writing side head of the pair (hereinafter referred to as a "second writing side head") position at the specified line;
making the reading side head as the object to be followed up read out a position of a track which the reading side head follows up (hereinafter referred to as a "second track") at this time;
taking the track position difference between the positions of the first track and the second track as the track position difference between the track of the first writing side head and the track of the second writing side head;
carrying out similar kinds of processing with pairs of writing side heads selected as objects of the measurement changed by turns to thereby obtain a track position difference between each of a plurality of the writing side heads (hereinafter referred to as a "first track position difference") on the side of the magnetic disk served for writing;
along with this, obtaining a track position difference between a plurality of the reading side heads corresponding to the first track position difference (hereinafter referred to as a "second track position difference"), when at least one reading side head presented on the master disk are provided as a plurality thereof;
using at least the first track position differences and the second track position differences when a plurality of the reading side heads are presented on the master disk on the rotary positioner; and
using at least the first track position difference when one reading head is presented on the master disk on the rotary positioner.

14. The magnetic data embedding system as claimed in claim 8, wherein:
the at least one rotary positioner and at least one reading head comprise a plurality of rotary positioners and a plurality of reading heads, each of which is carried by a respective one of the rotary positioners,
each writing head group has a single writing head,
the reading head and each of the writing heads carried by the same rotary positioner are in correspondence, and
the reading head and each of the writing heads are so provided as to position on approximately the same radial positions of the master disk and magnetic disks.

15. The magnetic data embedding system as claimed in claim 8, wherein:
the at least one rotary positioner and at least one reading head comprise a plurality of rotary positioners and a plurality of reading heads, each of which is carried by a respective one of the rotary positioners, and
on the same rotary positioner, a plurality of the reading heads are disposed at approximately equal intervals in the radial direction with respect to the master disk, and a plurality of the writing heads equal in number to the reading heads are contained in each reading head group and disposed at approximately equal intervals in the radial direction of the magnetic disks.

16. The magnetic data embedding system as claimed in claim 8, wherein:
the at least one rotary positioner and at least one reading head comprise a plurality of rotary positioners and a plurality of reading heads, and
on the same rotary positioner, one of the reading heads is provided adjacent the master disk and each of a plurality of writing head groups has writing heads, which are disposed at approximately equal intervals in the radial direction of the magnetic disks.

17. The magnetic data embedding system as claimed in claim 8, wherein the master disk is produced by carrying out writing thereto with any of the heads, with the master disk being stacked.

18. The magnetic data embedding system as claimed in claim 8, wherein the master disk is produced by writing of magnetic information by magnetic printing.

19. A magnetic data embedding system comprising:
a spindle motor having a shaft;
a master disk integrally mounted on a shaft of the spindle motor, the master disk magnetic data on at least one side thereof;
a plurality of magnetic disks for receiving magnetic writing, the magnetic disks being integrally mounted in a stack on the shaft of the spindle motor, each magnetic disk having a top side and a bottom side;
a reading head for reading the magnetic data on the master disk;
writing heads having one to one access to each side of each of the magnetic disks; and
a plurality of rotary positioners each integrally holding the reading head and the writing heads in a pivotable stack, and being disposed at the periphery of the stack of magnetic disks,
wherein the writing heads correspond to the reading head are mounted on the rotary positioners to carry out writing of one of the magnetic data and magnetic data prepared on the basis of the magnetic data, read out by the reading head, onto the magnetic disks, the writing being carried out in parallel with other writing heads on the same side of the magnetic disks within a track range for writing that is assigned to each of the writing heads.

20. The magnetic data embedding system as claimed in claim 19, wherein the master disk is produced by carrying out writing thereto with any of the heads on the rotary positioner, with the master disk being stacked.

21. The magnetic data embedding system as claimed in claim 19, wherein the master disk is produced by writing of magnetic information by magnetic printing.

22. A magnetic data embedding system, comprising:
a spindle motor;
a master disk integrally mounted on a shaft of the spindle motor, the master disk having servo information written on at least one side thereof;
a plurality of magnetic disks for receiving magnetic writing, the magnetic disks being integrally mounted in a stack on the shaft of the spindle motor, each magnetic disk having a top side and a bottom side;
read-only heads for reading the servo information on the master disk;
servo heads provided in one to one correspondence adjacent each side of each of the magnetic disks for carrying out writing one of the servo information and modified servo information prepared on the basis of the servo information;
a plurality of rotary positioners each integrally holding one of the read-only heads and some of the servo heads in a stack, the rotary positioners being disposed adjacent the periphery of the stack of magnetic disks;
a head position control unit provided for each of the rotary positioners, the unit carrying out comparison of a target head position and a detected head position to turn the rotary positioner so that the difference between the target head position and the detected head position becomes a minimum, and bringing the detected head position to be stably settled at the target head position, the target head position being externally given as a radial position on the master disk to be followed up by the read-only head, and the detected head position being taken as a radial position of the read-only head on the master disk, the radial position being obtained from the servo information read out by the read-only head;
a servo pattern generator provided for each of the rotary positioners and transmitting said one of the servo information and the modified servo information obtained from the servo information to each of the servo heads on the same rotary positioner and same side of the magnetic disks in synchronism with a clock signal, the clock signal being obtained from the servo information read by the read-only head held by the same rotary positioner;
a head position error storing unit storing head position errors, in the radial direction of the magnetic disks, among the servo heads gaining access to the same side of the magnetic disks in each of the rotary positioners, the errors being stored for each side of the magnetic disks; and
a track position correcting unit making at least any one of the servo pattern generators transmit one of the servo information and the modified servo information to corresponding servo heads, a track address of the information being corrected by using the head position error corresponding to each of the servo heads,
wherein each of the servo heads in each of the rotary positioners, with a track range for writing being assigned to the servo head, is made to carry out, in parallel with other servo heads, writing of one of the correct servo information and the correct modified servo information in the track range assigned to the servo head on each side of the magnetic disk corresponding to the servo head by keeping a correct track space between an adjacent track range.

23. The magnetic data embedding system as claimed in claim 22, further comprising a unit carrying out monitoring of a target head position of the read-only head corresponding to each of the servo heads writing the one of the servo information and the modified servo information, each with a corrected address, by checking the head position error corresponding to each of the servo heads, and allowing each of the servo heads to carry out writing only when each of the servo heads is in the track range assigned thereto.

24. The magnetic data embedding system as claimed in claim 22 wherein, with a read-only head on any of the rotary positioners (hereinafter referred to as a "first read-only head") being made stably settled on a track (hereinafter referred to as a "first track") on the master disk determined by a target head position given to the first read-only head by the head position error storing unit, a servo head, as an object of measurement corresponding to the first read-only head, (hereinafter referred to as a "first servo head") writes a specified signal on the magnetic disk served for writing,
next, a servo head, provided on another rotary positioner (hereinafter referred to as a "second servo head") side and positioned on the side of the magnetic disk served for writing, detects the signal to position the second servo head at the position of the signal,
then, in this state, a read-only head corresponding to the second servo head (hereinafter referred to as a "second read-only head") reads out servo information from the master disk, from which information a position of a track is detected at which the second read-only head is stably settled on the master disk (hereinafter referred to as a "second track"), and
finally, the difference between the positions of the first and second tracks is stored as a head position error between the first and second servo heads on the side of the magnetic disk served for writing.

25. The magnetic data embedding system as claimed in claim 22, wherein the track position correcting unit is a unit that corrects an output of the servo pattern generator on one side of the rotary positioners provided with servo heads carrying out writing of one of the servo information and the modified servo information, to which heads track ranges adjacent to each other are separately assigned.

26. The magnetic data embedding system as claimed in claim 22, further comprising a unit which is provided for each of the servo pattern generators for storing data to be written in a data region of the magnetic disk served for writing, provides data to the servo pattern generator, the data corresponding to an address of one of the servo information and the modified servo information transmitted by the servo generator to each of the servo heads corresponding thereto, and makes writing of the data to the data region corresponding to the address carried out.

27. The magnetic data embedding system as claimed in claim 22, wherein the master disk is produced by carrying out writing thereto with any of magnetic heads on the rotary positioner with the master disk being in the staked state.

28. The magnetic data embedding system as claimed in claim 22, wherein the master disk is produced by writing of magnetic information by magnetic printing.

* * * * *